United States Patent
Jacobsen et al.

(10) Patent No.: US 9,894,912 B2
(45) Date of Patent: Feb. 20, 2018

(54) CHILLED PRODUCT POST-PROCESSING APPARATUS

(71) Applicant: BlendTec, Inc., Orem, UT (US)

(72) Inventors: Joseph O. Jacobsen, American Fork, UT (US); David J. Throckmorton, Mapleton, UT (US); Thomas D. Dickson, Jr., Orem, UT (US); David Q. Bytheway, Springville, UT (US); Bradley S. Maxfield, Spanish Fork, UT (US); Evan J. Bauer, Holladay, UT (US)

(73) Assignee: BLENDTEC, INC., Orem, UT (US)

( * ) Notice: Subject to any disclaimer, the term of this patent is extended or adjusted under 35 U.S.C. 154(b) by 15 days.

(21) Appl. No.: 14/730,549

(22) Filed: Jun. 4, 2015

(65) Prior Publication Data
US 2016/0353766 A1 Dec. 8, 2016

(51) Int. Cl.
*A23G 9/00* (2006.01)
*A23G 9/12* (2006.01)
*A23G 9/04* (2006.01)
*A23G 9/28* (2006.01)

(52) U.S. Cl.
CPC .............. *A23G 9/12* (2013.01); *A23G 9/045* (2013.01); *A23G 9/281* (2013.01)

(58) Field of Classification Search
CPC . A23G 9/12; A23G 9/045; A23G 9/28; A23G 9/281
See application file for complete search history.

(56) References Cited

U.S. PATENT DOCUMENTS

| | | | | |
|---|---|---|---|---|
| 2,775,877 A | * | 1/1957 | Bruntjen | F25D 31/002 62/342 |
| 3,830,407 A | * | 8/1974 | Wierlo | A23G 9/281 222/129.1 |
| 4,696,417 A | | 9/1987 | Ugolini | |
| 4,900,158 A | | 2/1990 | Ugolini | |
| 5,150,967 A | | 9/1992 | Neilson et al. | |
| 5,615,952 A | | 4/1997 | Cocchi | |
| 5,653,118 A | | 8/1997 | Cocchi et al. | |
| 5,713,214 A | | 2/1998 | Ugolini | |
| 5,735,602 A | | 4/1998 | Salvatore | |

(Continued)

FOREIGN PATENT DOCUMENTS

EP 2478774 A1 7/2012

OTHER PUBLICATIONS

PCT International Search Report for International Application No. PCT/US2016/031994, dated Aug. 16, 2016 (3 pp.).

*Primary Examiner* — Orlando E Aviles Bosques
(74) *Attorney, Agent, or Firm* — Holland & Hart

(57) ABSTRACT

A machine for processing a chilled food product includes a product in a storage container, wherein the product has a frozen portion and a non-frozen portion in the storage container, and the frozen portion has a granular size. The machine mixes the frozen portion of the product with the non-frozen portion of the product within the storage container, flows the frozen portion and non-frozen portion into contact with a shearing apparatus, and shears at least the frozen portion with the shearing apparatus, thereby reducing the granular size of the frozen portion. The machine may refine and process chilled food products such as smoothies and slushes to have a smoother and more even consistency.

12 Claims, 23 Drawing Sheets

(56) References Cited

U.S. PATENT DOCUMENTS

| | | |
|---|---|---|
| 5,906,105 A | 5/1999 | Ugolini |
| 6,058,721 A | 5/2000 | Midden et al. |
| 6,149,035 A | 11/2000 | Gorski et al. |
| 6,286,724 B1 | 9/2001 | Midden |
| 6,430,952 B1 | 8/2002 | Midden et al. |
| 6,446,835 B1 | 9/2002 | Ford |
| 6,467,944 B2 | 10/2002 | Ugolini |
| 6,543,843 B1 | 4/2003 | Moilanen |
| 6,619,056 B2 | 9/2003 | Midden et al. |
| 6,705,106 B1 | 3/2004 | Cunha et al. |
| 6,712,237 B2 | 3/2004 | Medina et al. |
| 6,745,592 B1 | 6/2004 | Edrington et al. |
| 6,766,650 B2 | 7/2004 | Cunha et al. |
| 6,845,703 B2 | 1/2005 | Ugolini |
| 6,863,916 B2 | 3/2005 | Henriksen et al. |
| 6,910,348 B2 | 6/2005 | Ugolini |
| 6,918,258 B2 | 7/2005 | Cunha et al. |
| 6,986,441 B2 | 1/2006 | Scordato et al. |
| 7,100,392 B2 | 9/2006 | Cortese |
| 7,140,196 B2 | 11/2006 | Pfeifer et al. |
| 7,152,765 B1 | 12/2006 | Midden et al. |
| 7,278,276 B2 | 10/2007 | Boyer et al. |
| 7,299,944 B2 | 11/2007 | Roady et al. |
| 7,712,321 B2 * | 5/2010 | Kadyk ............... A23G 9/12 62/136 |
| 8,123,075 B2 | 2/2012 | Kadyk |
| 8,157,117 B2 | 4/2012 | Grampassi |
| 8,404,166 B2 | 3/2013 | Cocchi et al. |
| 8,561,839 B2 | 10/2013 | Cocchi et al. |
| 8,714,410 B2 | 5/2014 | Wadle et al. |
| 8,887,958 B2 | 11/2014 | Kadyk et al. |
| 8,899,063 B2 | 12/2014 | Ugolini |
| 2003/0068406 A1 * | 4/2003 | Nair ............... A23C 9/1322 426/34 |
| 2003/0145734 A1 | 8/2003 | Ervin |
| 2003/0200870 A1 | 10/2003 | Cocchi et al. |
| 2004/0226305 A1 | 11/2004 | Grampassi |
| 2007/0017234 A1 | 1/2007 | Moulder et al. |
| 2007/0242562 A1 | 10/2007 | Huang |
| 2007/0295750 A1 | 12/2007 | Cocchi et al. |
| 2008/0173672 A1 | 7/2008 | Martin |
| 2011/0011887 A1 | 1/2011 | Zaniboni et al. |
| 2011/0101039 A1 | 5/2011 | Cocchi et al. |
| 2011/0120163 A1 | 5/2011 | Wadle et al. |
| 2011/0256617 A1 | 10/2011 | Cocchi et al. |
| 2011/0300264 A1 * | 12/2011 | Neta ............... A23G 9/045 426/61 |
| 2012/0055189 A1 | 3/2012 | Sipp et al. |
| 2012/0199608 A1 | 8/2012 | Cocchi et al. |
| 2012/0219442 A1 | 8/2012 | Dong et al. |
| 2013/0014650 A1 | 1/2013 | Cocchi et al. |
| 2013/0098098 A1 | 4/2013 | Ugolini |
| 2013/0152620 A1 | 6/2013 | Ugolini |
| 2013/0263747 A1 | 10/2013 | Ugolini |
| 2013/0269381 A1 | 10/2013 | Cocchi et al. |
| 2013/0327080 A1 | 12/2013 | Sipp et al. |
| 2014/0295044 A1 | 10/2014 | Cocchi et al. |
| 2014/0332560 A1 | 11/2014 | Sipp et al. |
| 2014/0356494 A1 | 12/2014 | Cocchi et al. |

* cited by examiner

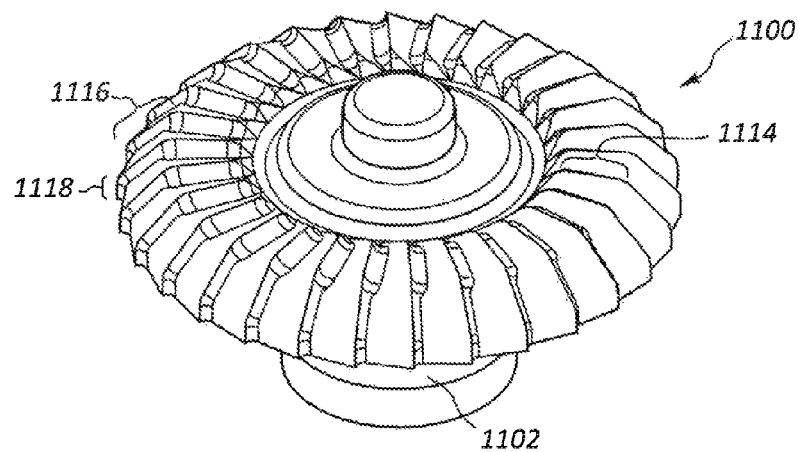
FIG. 15A
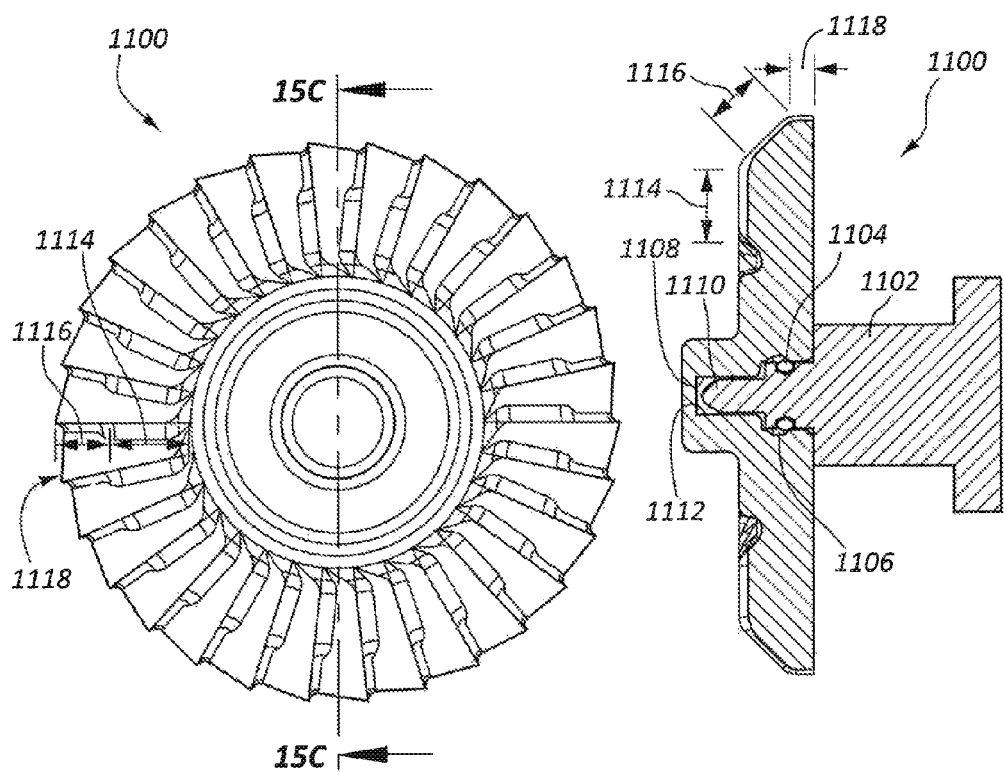
FIG. 15B
FIG. 15C though they are usually easier to purchase and maintain than the complex blending devices of the first method.

In view of the above, there is a need for improvements in the methods and apparatuses used to prepare and dispense high quality chilled products.

CHILLED PRODUCT POST-PROCESSING APPARATUS

TECHNICAL FIELD

The present disclosure is generally directed to machines and methods used to make chilled slush, smoothie, granita, and related products, and the disclosure particularly relates to systems and methods for smoothing the product dispensed from these machines.

BACKGROUND

Smoothies, slushes, and related chilled or icy products are enjoyed by consumers worldwide. Generally, these products are made using one of two popular methods. In the first method, pellets or cubes of ice may be added to a mixture of other ingredients and then blended in a blending jar using a blending blade. This process breaks up the ice into smaller, smoother granules and thoroughly mixes all of the ingredients into a smoothie consistency that is based primarily on variables within the control of the operator, such as the properties of the ingredients and ice and the blending mode and duration.

Due to the strain on the blender, consistently blending hard ingredients including ice and frozen fruit requires high-performance, expensive blending equipment. In some cases, the product is prepared in the blender using pumps, wherein at least portions of the product are pumped into a blending chamber, combined with ice, and then blended before being dispensed to a customer's cup. These devices require tubing and pumps for fresh ingredient supply and to drain out the chamber after blending, thereby increasing the blending apparatus's cost, complexity, and difficulty to maintain and clean. In a commercial setting, this method of preparation also has the drawback of requiring time to measure and blend ingredients for each batch of product when the product is ordered, especially since the consistency of the product quickly deteriorates as the blended ice melts. Thus, new batches of smoothies or slushes have to be made to order with a delay and wait time between ordering the product and serving the customer. Some machines use refrigeration for non-shelf-stable product, but they are accordingly even more expensive.

The other popular method of preparing and serving slushes and smoothies does not require adding ice into other ingredients. In this method, all ingredients are added to a slush machine (e.g., a granita machine) in liquid form, and the product is chilled and agitated in a hopper. Over time, the product is chilled by contact with refrigerated surfaces in the hopper, and ice crystals form in the liquid. Meanwhile, the product is circulated through the hopper by a mixer (e.g., an auger) and the ice is thereby inhibited from forming large blocks and is distributed throughout the liquid in the hopper. To prevent the ice from growing too large over time, the temperature in the hopper is periodically (e.g., nightly) elevated to allow the ice to completely melt, and the process starts over again when the temperature is dropped to an ice-forming level again.

The slushy product can be dispensed from one of these machines on demand, but the ice crystals formed by this method have inconsistent size and are generally substantially larger than the crystals made by the blending machines of the first method described above. Thus, the consistency of the product is not as smooth as the product from a blending machine. The texture and flavor are widely regarded as being inferior as well. The machines still remain popular,

SUMMARY

One aspect of the present disclosure relates to a method of processing a chilled food product. The method may comprise providing a product in a storage container, with the product having a frozen portion and a non-frozen portion in the storage container. The frozen portion may have a granular size. The method may further include mixing the frozen portion of the product with the non-frozen portion of the product within the storage container and flowing the frozen portion and non-frozen portion into contact with a shearing apparatus. The method may also comprise shearing at least the frozen portion with the shearing apparatus, thereby reducing the granular size of the frozen portion.

Flowing the frozen portion and non-frozen portion into contact with the shearing apparatus may comprise moving at least some of the frozen portion and at least some of the non-frozen portion from a first area of the storage container into a second area of the storage container. Flowing the frozen portion and non-frozen portion into contact with the shearing apparatus may also comprise moving at least some of the frozen portion and at least some of the non-frozen portion from the storage container into a shearing chamber. In some embodiments, the method may further comprise continuously shearing the product using the shearing apparatus. The continuous shearing may be performed only in response to a request for the product.

In some arrangements, the method may further comprise shearing a discrete amount of the product by the shearing apparatus in response to a request for the product. The method may also comprise adding an additional ingredient into the discrete amount of the product. The product may be at least partially frozen by moving non-frozen portions of the product into contact with a refrigerated element in the storage container. The product may be at least partially frozen by refrigerating the storage container sufficient to freeze at least some of the non-frozen portion of the product. Mixing the product may comprise substantially evenly distributing the frozen portion among the non-frozen portion of the product.

The shearing apparatus may at least partially rotate in a vertical plane to shear the frozen portion. The shearing apparatus may also at least partially rotate in a horizontal plane to shear the frozen portion. The product may be dispensed after being sheared by the shearing apparatus.

In another aspect of the present disclosure, a chilled food product processing machine is provided which may comprise a storage container configured to hold a supply of fluid ingredients, a refrigeration apparatus configured to form ice crystals in the supply of fluid ingredients in the storage container, a fluid circulating apparatus within the storage container, wherein the fluid circulating apparatus may be operable to distribute frozen portions of the supply of fluid ingredients through the storage container, a blending apparatus connected to the storage container, wherein the blending apparatus may be operable to shear ice crystals in the supply of fluid ingredients, thereby reducing an ice crystal grain size in the supply of fluid ingredients, and a dispenser opening in the storage container, wherein the supply of fluid ingredients may be flowable through the dispenser opening to exit the storage container.

In this machine, the blending apparatus may extend into the storage container. The blending apparatus may comprise a rotatable blending blade. The blending apparatus may comprise a rotor and a stator. The rotor and stator may be concentrically aligned.

The machine may have a shearing passage having first and second end openings in fluid communication with the storage container, wherein the blending apparatus is configured to shear ice crystals in the supply of fluid ingredients when the ice crystals pass through the shearing passage.

The machine may also have a shearing chamber within a housing attached to the storage container, wherein the blending apparatus is operable to shear ice crystals within the shearing chamber. The shearing chamber may be configured to receive an additional ingredient prior to shearing ice crystals within the shearing chamber.

A surface may be within the storage container, wherein the refrigeration apparatus is configured to chill the surface within the storage container to form ice crystals in the supply of fluid ingredients. The surface may be a cylinder extending into the storage container.

The supply of fluid ingredients in the machine may be flowable to the blending apparatus through the dispenser opening. The fluid circulating apparatus may be an auger. The refrigeration apparatus may comprise a chilled surface extending into contact with the supply of fluid ingredients in the storage container.

In yet another aspect of the disclosure, a method of processing a food product stored in a storage container is provided. The method may comprise providing a storage container in fluid communication with a blending apparatus, wherein a food product stored by the storage container is dispensable from the storage container by flowing into the blending apparatus and then out of the blending apparatus through a dispenser. The method may further include receiving a request for the food product, enabling flow of the food product into the blending apparatus, engaging the blending apparatus, thereby shearing the food product in the blending apparatus, and enabling flow of the food product through the dispenser.

Receiving a request for the food product may comprise detecting operation of the dispenser by a user. Operation of the dispenser by a user may engage the blending apparatus.

Shearing the food product in the blending apparatus may comprise at least partially breaking down the food product into particles smaller than particles of the food product in the storage container.

In some embodiments, enabling flow of the food product into the blending apparatus may comprise operating a mixing apparatus in the storage container. Enabling flow of the food product into the blending apparatus may also comprise inducing flow of the food product by gravity or fluid pressure.

In another aspect of the disclosure, a method of processing a food product is provided that may comprise providing a storage container containing a food product and a rotor-stator assembly connected to the storage container. The rotor-stator assembly may have a rotor, a stator, and an exit opening. The method may also include moving the food product into contact with a horizontal surface of the rotor, rotating the rotor to direct the food product along the horizontal surface to a position under an angled surface of the stator, shearing the food product between the angled surface of the stator and an angled surface of the rotor, wherein the angled surface of the rotor is positioned radially outward relative to the horizontal surface, and then advancing the food product to the exit opening of the rotor-stator assembly. Some embodiments may further comprise advancing the food product between the stator and a vertical surface of the rotor before advancing the food product to the exit opening.

The above summary of the present invention is not intended to describe each embodiment or every implementation of the present invention. The Figures and the detailed description that follow more particularly exemplify a preferred embodiment.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 15A is an isometric view of a rotor assembly of the present disclosure.

FIG. 15B is a top view of the rotor assembly of FIG. 15A.

FIG. 15C is a side central section view of the rotor assembly of FIG. 15A.

Figure 1:
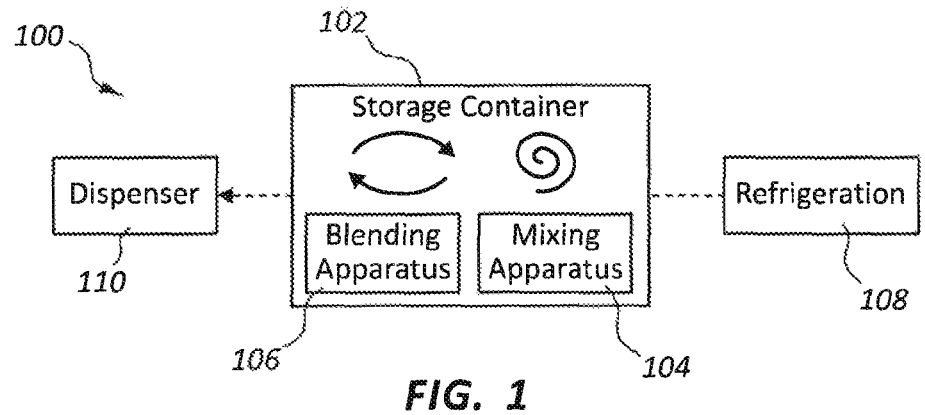
FIG. 1 is a schematic representation of a system for processing a chilled food product.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to methods and apparatuses used to process chilled products such as smoothies, slushes, and other frozen or semi-frozen beverages. Embodiments of the present disclosure may beneficially reduce the size of ice crystals in a chilled product by blending or pulverizing the product continuously, periodically, or in stages as ice crystals form in the product and/or when the product is requested, served, or dispensed from a storage container. Thus, frozen beverages produced by the present systems and methods may be dispensed from a processing machine with a smoother consistency than beverages conventionally produced by these machines. In addition, when these methods are applied to a slush/granita machine, the system may retain other beneficial properties, such as being simple to operate, relatively inexpensive, and easily cleaned and maintained.

In one embodiment of a processing system 100, shown in schematic view in FIG. 1, ingredients may be held in a storage container 102 that is connected to a refrigeration apparatus 108 and a mixing apparatus 104. The storage container 102 may be a hopper, tank, jar, tub, or other fluid storage device. The refrigeration apparatus 108 may chill or freeze portions of the ingredients in the storage container 102, and the mixing apparatus 104 may circulate the frozen and non-frozen portions of the ingredients to distribute the frozen portions amongst the other ingredients in the storage container 102. In some embodiments, the refrigeration apparatus 108 may refrigerate an element within the storage container 102, such as a bottom surface of the storage container 102 or a surface extending into the volume of the storage container (e.g., a refrigerated cylinder).

The storage container 102 may be connected to a blending apparatus 106, such as, for example, a blending blade or rotor/stator assembly, that may come into contact with frozen portions of the ingredients in (or adjacent to) the storage container 102. The blending apparatus 106 may be used to break up and pulverize frozen portions of the ingredients and keep ice crystals from growing to an undesirable granular size in the storage container 102 while the frozen ingredients are stored in the storage container 102. Thus, product served through the dispenser 110 may have managed consistency based at least in part on the use of the blending apparatus 106 to smooth frozen portions in advance of dispensing from the storage container 102.

Using this system 100, blending may take place while the product is stored in the storage container 102. In some cases, the blending apparatus 106 may be connected to the storage container 102, wherein the product may be pumped into the blending apparatus 106 and then returned to the storage container 102. Thus, the blending apparatus 106 may blend the product while it is in the storage container 102, or it may blend the product by circulating the product through an external blending apparatus and back into the storage container 102. An external blending apparatus may comprise conduit and pumps to route the product through the blending apparatus, or product in the storage container 102 may be drawn into a passage through which the product may be processed by the blending apparatus 106 while the blending apparatus 106 is active. The storage container 102 therefore may have portions of the blending apparatus 106 extending into its internal volume, or there may be a recess or passage formed in the storage container 102 in which the blending apparatus 106 operates. The main volume of the storage container 102 may be referred to as a first area of the storage container, and the passage, recess, or vicinity of the blending apparatus 106 may be referred to as a second, separate area of the storage container in fluid communication with the first area. Thus, the product may be flowed from the first area to the second area of the storage container to be sheared or blended by the shearing apparatus. In some embodiments, a passage from the storage container 102 may lead to a shearing or blending chamber in which the blending apparatus 106 is located.

The mixing apparatus 104 may be used to mix the ingredients in the storage container 102. Due to the mixing apparatus, the ingredients in the storage container 102 may flow throughout the storage container 102 and/or recesses/passages that are in fluid communication with the blending apparatus 106. In one example, the mixing apparatus 104 may be a vane or auger in the storage container 102 that is configured to induce flow of the ingredients in the storage container 102. The mixing apparatus 104 may beneficially also help prevent ice buildup on a refrigerated surface in the storage container 102 by scraping the refrigerated surface as it moves in the storage container 102 or by inducing a sufficient rate of flow to prevent ice from undesirably accumulating on the refrigerated surface. In some embodiments, the entire storage container 102 may be cooled or refrigerated. The mixing apparatus 104 may therefore be configured to scrape ice or otherwise circulate or cause flow of ice away from any other ice formation points in the storage container 102.

In some arrangements, the blending apparatus 106 may be operated continuously to keep ice crystals from growing to an undesirable size in the storage container 102. The blending apparatus 106 may also be activated periodically or intermittently to keep the stored product at a predetermined consistency. The blend timing, speed, and other settings of the blending apparatus 106 may be controlled based on the desired output consistency of the processing system 100 and the properties of the ingredients (e.g., their thickness, wetness, and solidity), properties of the refrigeration system (e.g., its temperature settings and efficiency), properties of the mixing apparatus (e.g., its size and mixing efficiency), and properties of the storage container (e.g., its size and internal temperature). The blending apparatus 106 may operate on a schedule or may operate based on temperature, the granular size of frozen portions of the ingredients in the storage container 102, the amount of product dispensed over time, the ingredients used in the storage container 102, or other properties of the system 100.

Figure 2:
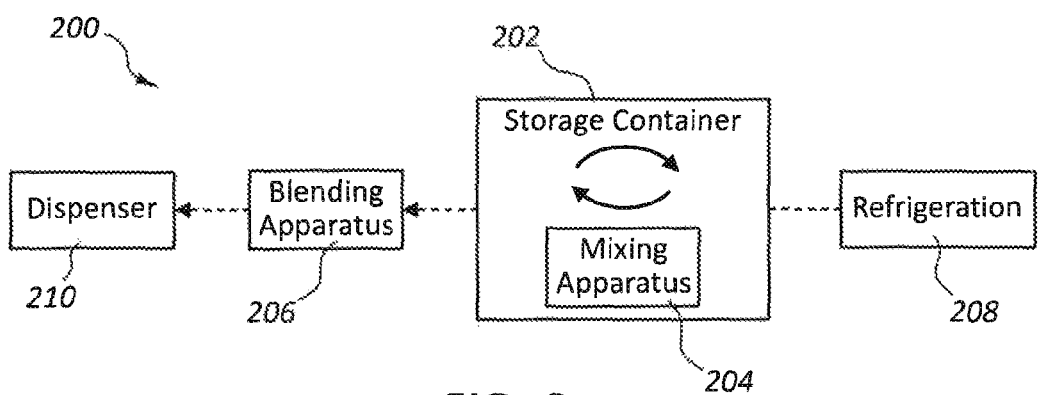
FIG. 2 is a schematic representation of a system for processing a chilled food product.

FIG. 2 shows a schematic view of another system 200 according to the present disclosure. As with system 100, this system 200 includes a storage container 202, mixing apparatus 204, blending apparatus 206, refrigeration 208, and dispenser 210. In this embodiment, however, the blending apparatus 206 is configured to process the product just prior to its delivery to the dispenser 210. In other words, the blending apparatus 206 blends the stored product primarily "on demand" or in response to a request for the product (e.g., in response to operation of the dispenser 210 or another external signaling feature). For example, the dispenser 210 may engage a switch that turns on the blending apparatus 206 when it is time to dispense the product. The product may then move through the blending apparatus 206 before being dispensed through the dispenser 210. The blending apparatus 206 of this embodiment may therefore be operated substantially only at the time finished product needs to be dispensed. In some cases, the blending apparatus 206 may also be briefly operated for maintenance or sanitation reasons, such as by running the blending apparatus 206 to periodically circulate stationary product inside the blending apparatus 206 back into the storage container 202 in order to maintain the consistency of the product throughout the storage container 202 and blending apparatus 206.

This system 200 may consistently provide the product at a desired consistency at the point of dispensing through the dispenser 210 since ice in the product may be blended to a precise final consistency at the time it will be served. Thus, the product should not be able to accumulate larger ice crystals between the time of shearing and the time of dispensing. Also, the system 200 may more reliably provide an optimal consistency of the product because only the product being dispensed needs to be at that consistency while the remaining product in the storage container 202 may have a different consistency. Generally, it is easier to keep a small amount of the product at a desired consistency than to keep the entire store of the product at that consistency, so this system 200 keeps the small amount of product that moves through the blending apparatus 206 at a desired consistency rather than the rest of the product in the storage container 202. The rest of the product in the storage container 202 may also still be circulated to prevent formation of large frozen crystals, but the size of those frozen portions does not need to be closely managed since the final consistency will be reached after shearing in the blending apparatus 206.

The settings of the blending apparatus 206 may be controlled to ensure that the frozen portions of the product (e.g., ice crystals suspended in the product) that are provided through the dispenser 210 have a consistent size regardless of the size of the frozen portions entering the blending apparatus 206 from the storage container 202. For example, the consistency of the product in the storage container may be measured at the time a dispensing signal is received, and the blending apparatus 206 may have its blending speed and/or duration controlled based on the amount of post-processing needed to reach a preferable, high-quality consistency when the product exits the dispenser 210. More or less speed or time may be necessary based on the thickness and grain size in the product of the storage container 202.

In some embodiments, the consistency of the product in the storage container 202 may be estimated based on the time that the product has been at a particular temperature in the storage container 202. For example, in some cases the granular size of the frozen portions in the storage container 202 may be estimated based on the length of time the product has been at a certain temperature, so the blending apparatus 206 may be controlled to blend at a speed that relates to the time that the product has been in the storage container 202 at that temperature in order to smooth frozen portions having that estimated size. In some embodiments, the consistency of the product may be measured as it is processed by the blending apparatus, such as while it is moving from the storage container 202 to the blending apparatus 206. The blending apparatus 206 may then be controlled based on this measured consistency so that product with larger chunks of frozen portions is more refined by the blending apparatus 206 than product with smaller chunks as it passes through the blending apparatus 206.

Figure 3:
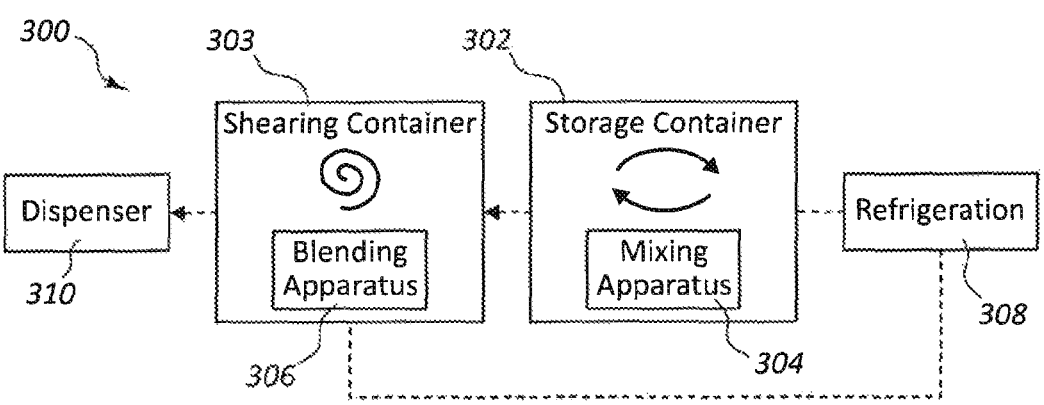
FIG. 3 is a schematic representation of a system for processing a chilled food product.

FIG. 3 shows a schematic view of another embodiment of a system 300 for processing chilled product. As in the embodiments of FIGS. 1-2, the system 300 may comprise a storage container 302 containing a mixing apparatus 304 and having a connection to a refrigeration apparatus 308. However, in this system 300, product in the storage container 302 may be transferable to a separate shearing container 303 having a blending apparatus 306. Product is then dispensable through a dispenser 310 upon exiting the shearing container 303. Thus, product may be mixed and circulated in the storage container 302 to prevent formation of overly large frozen portions, but a discrete amount of the product may be blended or sheared in a separate shearing container 303 that is placed in series between the storage container 302 and the dispenser 310 to reach an optimal dispensable consistency.

In this system 300, ice crystals may form in the storage container 302 as a result of the refrigeration apparatus 308 and as the mixing apparatus 304 circulates the product in the storage container 302. The shearing container 303 generally does not hold a reserve of the product, but instead a portion of the product may be delivered or transferred from the storage container 302 to the shearing container 303 when a request for the finished product is received (e.g., when the dispenser 310 is operated or another control signal is sent to the system 300). The portion of the product is then blended by the blending apparatus 306 to the desired consistency and is accessible at the dispenser 310.

This system 300 allows the product to be evenly blended in discrete batches, so the entire batch has a high likelihood of having even consistency. Additionally, the implementation of the shearing container 303 may allow the system 300 to facilitate additional add-in ingredients to an individual batch as needed. The additional ingredients may be added to the shearing container 303 without being distributed into product held by the storage container 302. Furthermore, cleaning and maintenance of the shearing container 303 may be simple, since the shearing container 303 may have a volume that is smaller and/or easier to access than the storage container 302. After a custom batch of product is prepared in the shearing container 303 and dispensed, the shearing container 303 may then be cleaned before another batch is prepared. In some embodiments, the shearing container 303 may be sized to hold a small number of portions or servings of the product, while the storage container 302 may be sized to hold a plurality of portions or servings that could be held by the shearing container 303.

The refrigeration apparatus 308 may provide temperature control to the storage container 302 and may also provide temperature control of the shearing container 303. In some arrangements, the refrigeration apparatus 308 may only provide cooling to the storage container 302. The temperature of the product during and after shearing may be controlled more carefully by providing cooling to the shearing container 303, particularly for product that needs to be blended for an extended time and therefore potentially has a significant rise in temperature in the shearing container 303.

The schematic views of FIGS. 1-3 are intended to represent examples of the general concepts of the systems 100, 200, 300 they represent, and are therefore not intended to restrict the disclosure to the comparative sizes or spatial positions of respective elements of the systems 100, 200, 300. Instead, these systems 100, 200, 300 represent exemplary systems and elements that may be used to implement embodiments of the present disclosure.

FIGS. 4A-6 show views of an example embodiment of a processing system of the present disclosure. These views show an exemplary implementation of the system 200 of FIG. 2 when applied to a specific granita/slush machine 400. The machine 400 comprises a base 402, a hopper 404, a refrigeration assembly 406, a dispenser apparatus 408, and a blending assembly 410. An auger 412 is positioned to rotate around a refrigerated cylinder 414 within the hopper 404. The auger 412 and/or cylinder 414 may be configured to axially rotate within the hopper 404 to circulate fluids in the hopper 404 and to keep frozen portions of product in the hopper 404 from accumulating on the refrigerated cylinder 414 over time. In some embodiments, the auger 412 may have a helical shape configured to circulate product in the hopper 404 toward the front of the hopper 404 where it can be dispensed through the blending assembly 410 and dispenser apparatus 408.

Figure 5A:
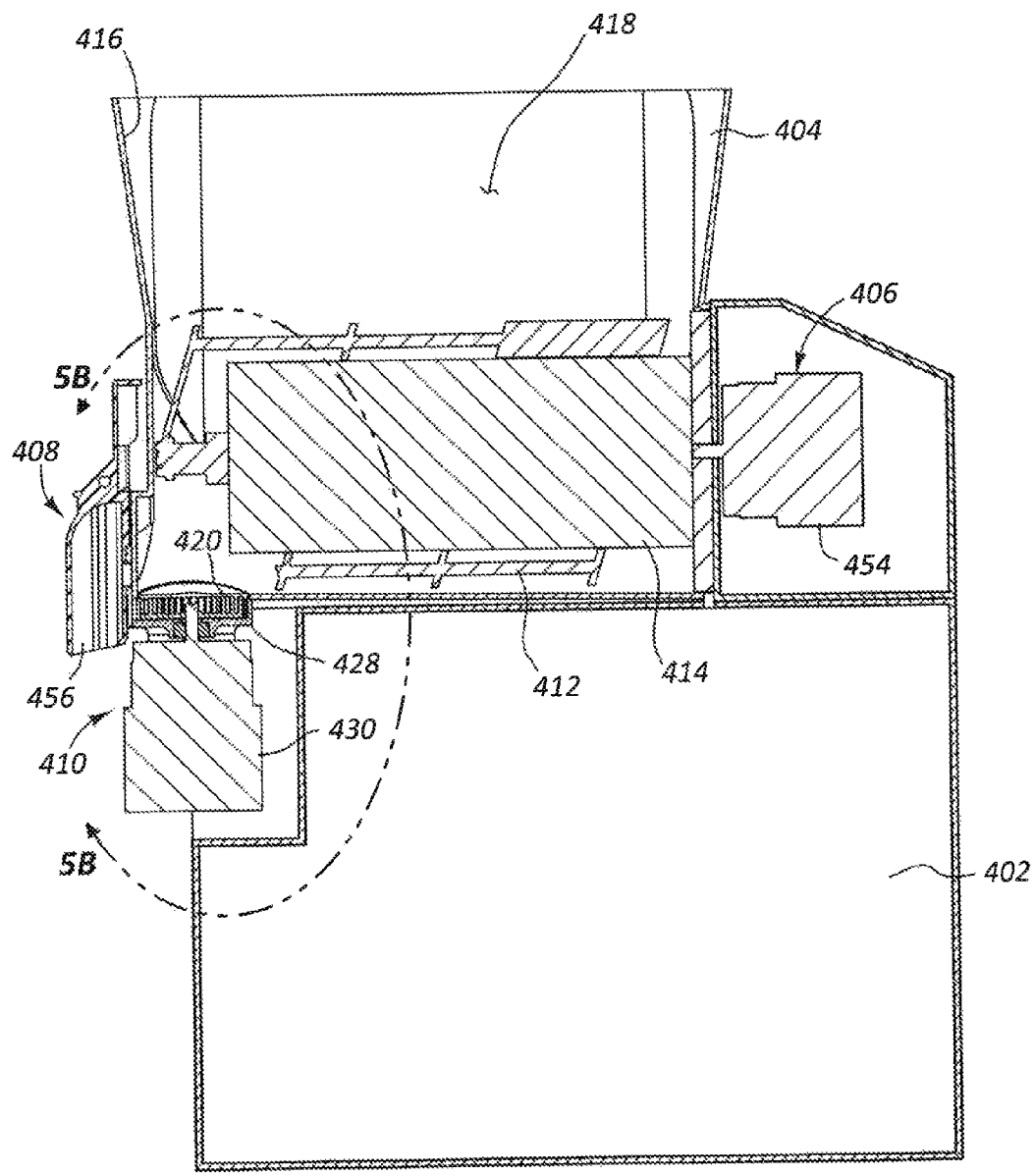
FIG. 5A is a central side section view of the machine of FIG. 4A.

The refrigeration assembly 406 is shown in FIG. 5A referencing the auger motor 454. Additional refrigeration assembly 406 components such as, for example, a condenser, an evaporator, coils, and/or a pump, are not shown. Thus, the refrigeration assembly 406 is representative of a generic refrigeration assembly that would be implemented to chill or freeze product in the hopper 404 without reference to specific features or components of the refrigeration assembly 406.

The hopper 404 may comprise an inner surface 416 defining an inner volume 418 for storage of product in the machine 400. The top of the hopper 404 may be covered or sealed to keep the internal product clean. The hopper 404 may also comprise a lower opening 420 through which product may enter the blending assembly 410. See FIGS. 5A-5B. In the embodiment shown, the lower opening 420 is formed in a bottom surface of the hopper 404 and product flows downward from the hopper 404 into the blending assembly 410. In other embodiments, the lower opening 420 may be formed in a sidewall of the hopper 404 and product may flow laterally or diagonally from the hopper 404 into the blending assembly 410. For example, in some configurations the blending assembly 410 may have components configured to rotate primarily in a vertical plane and product may enter the blending assembly 410 through a side opening in the blending assembly 410.

Figure 4A:
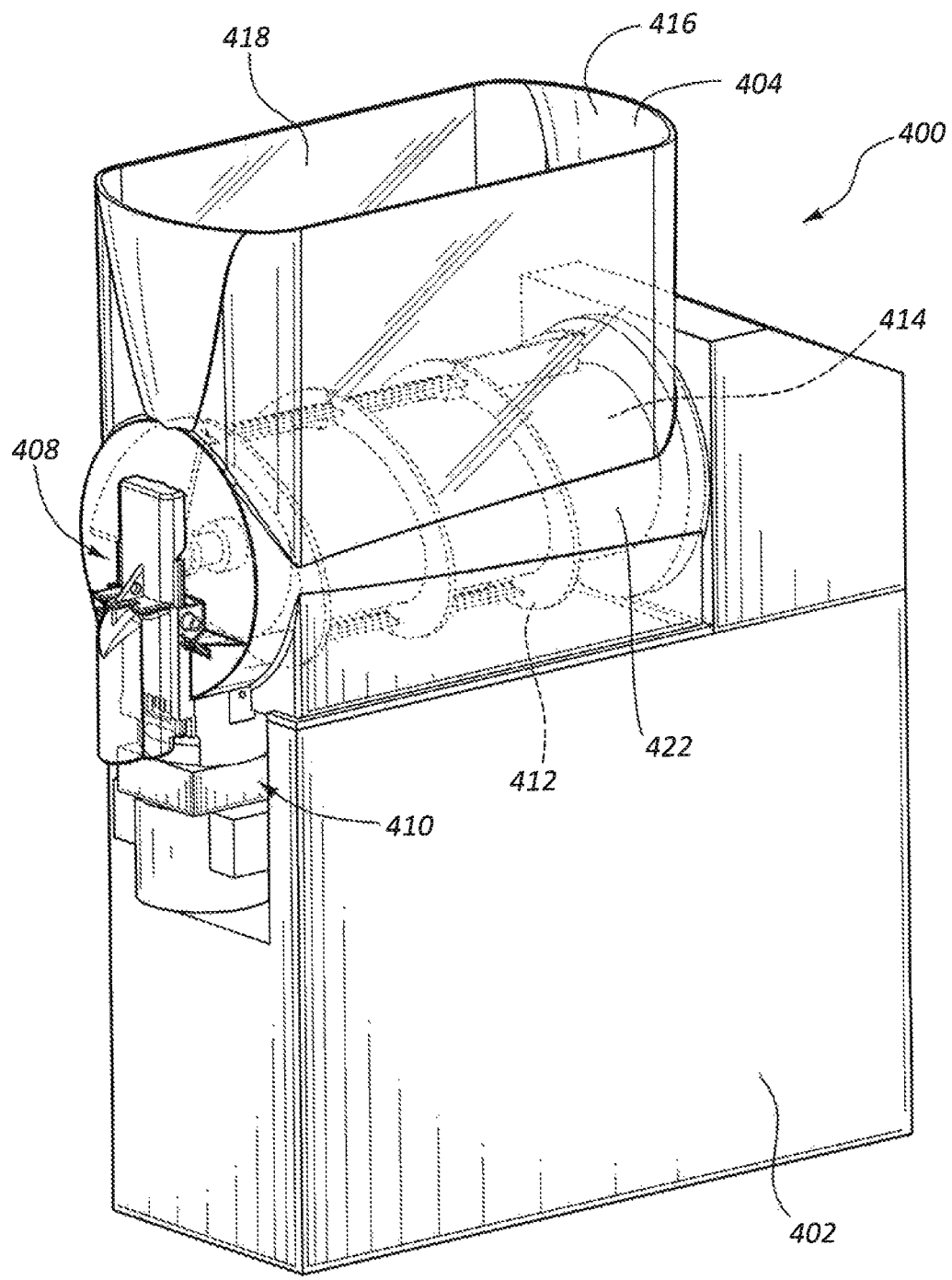
FIG. 4A is a perspective view of an example machine for processing a chilled food product.
Figure 4B:
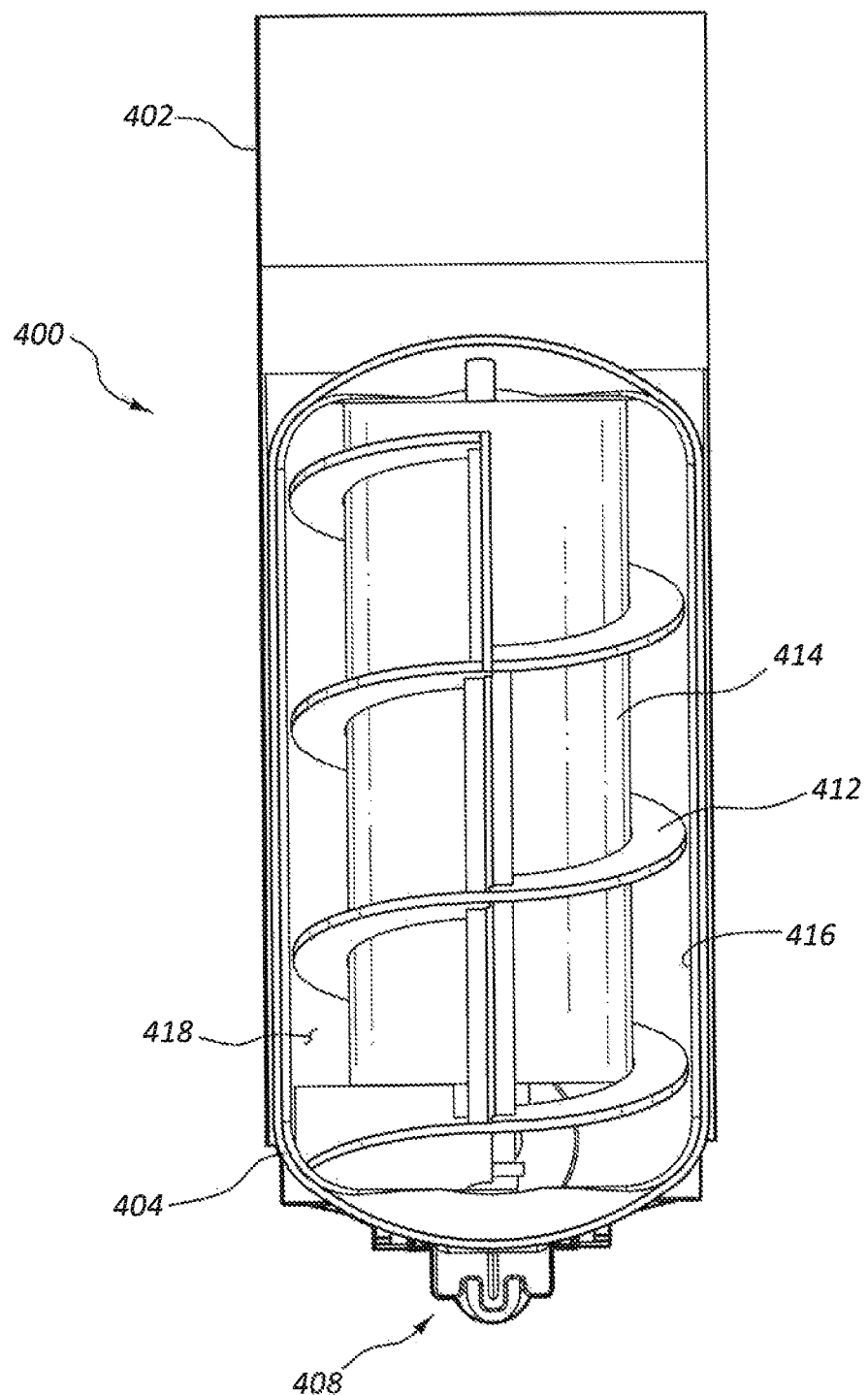
FIG. 4B is a top view of the machine of FIG. 4A.
Figure 4C:
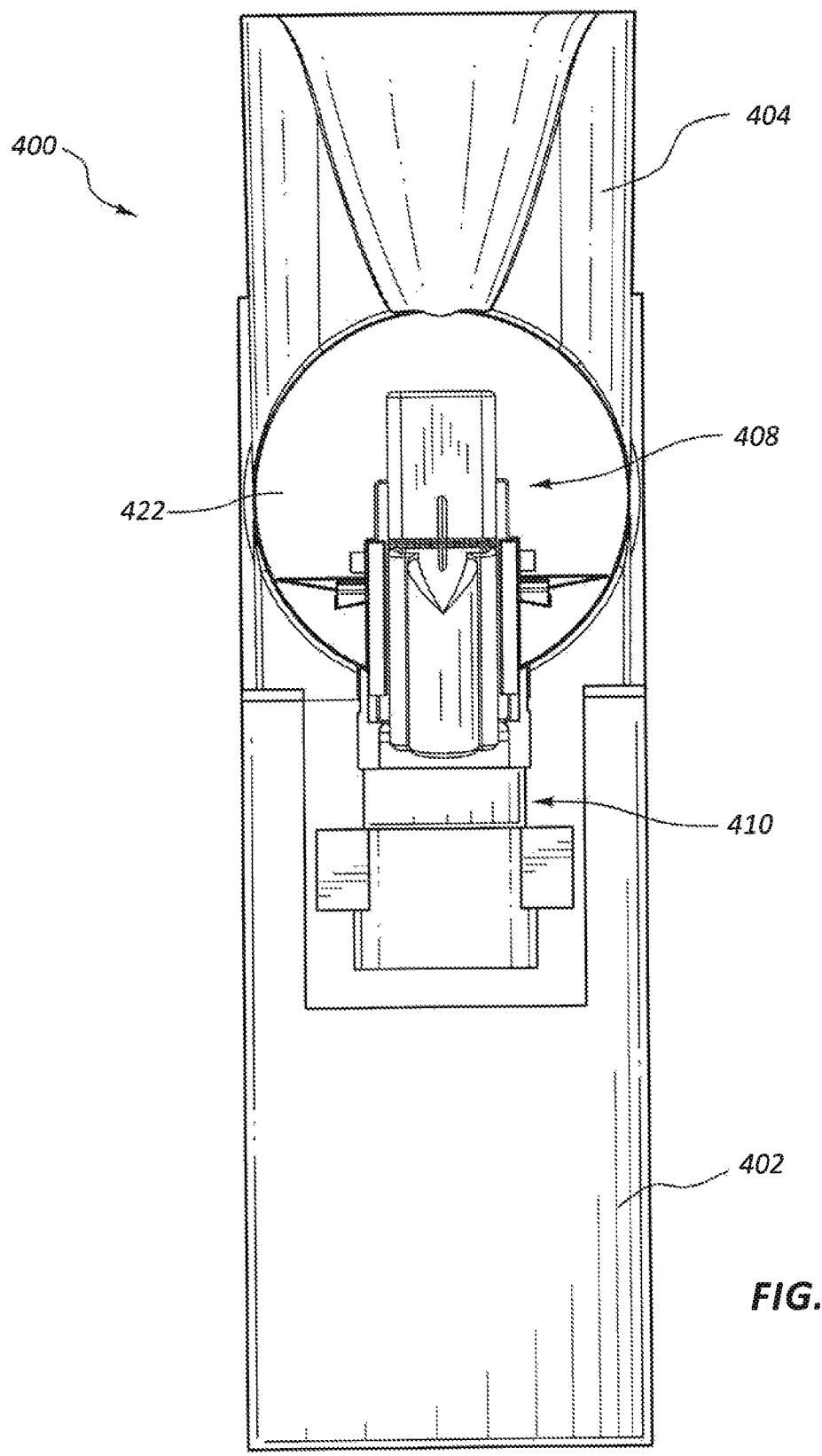
FIG. 4C is a front view of the machine of FIG. 4A.

The inner surface 416 of the hopper 404 may have a shape configured to maximize the efficiency of the auger 412 as it circulates product in the inner volume 418. For example, as shown in FIGS. 4A-4B, the hopper 404 may comprise a contoured portion 422 where the auger 412 is positioned so that the inner surface 416 is close to the auger 412. Thus, the auger 412 may scrape frozen portions of product from the inner surface 416 of the hopper 404 in addition to scraping frozen portions from the refrigerated cylinder 414.

Figure 5B:
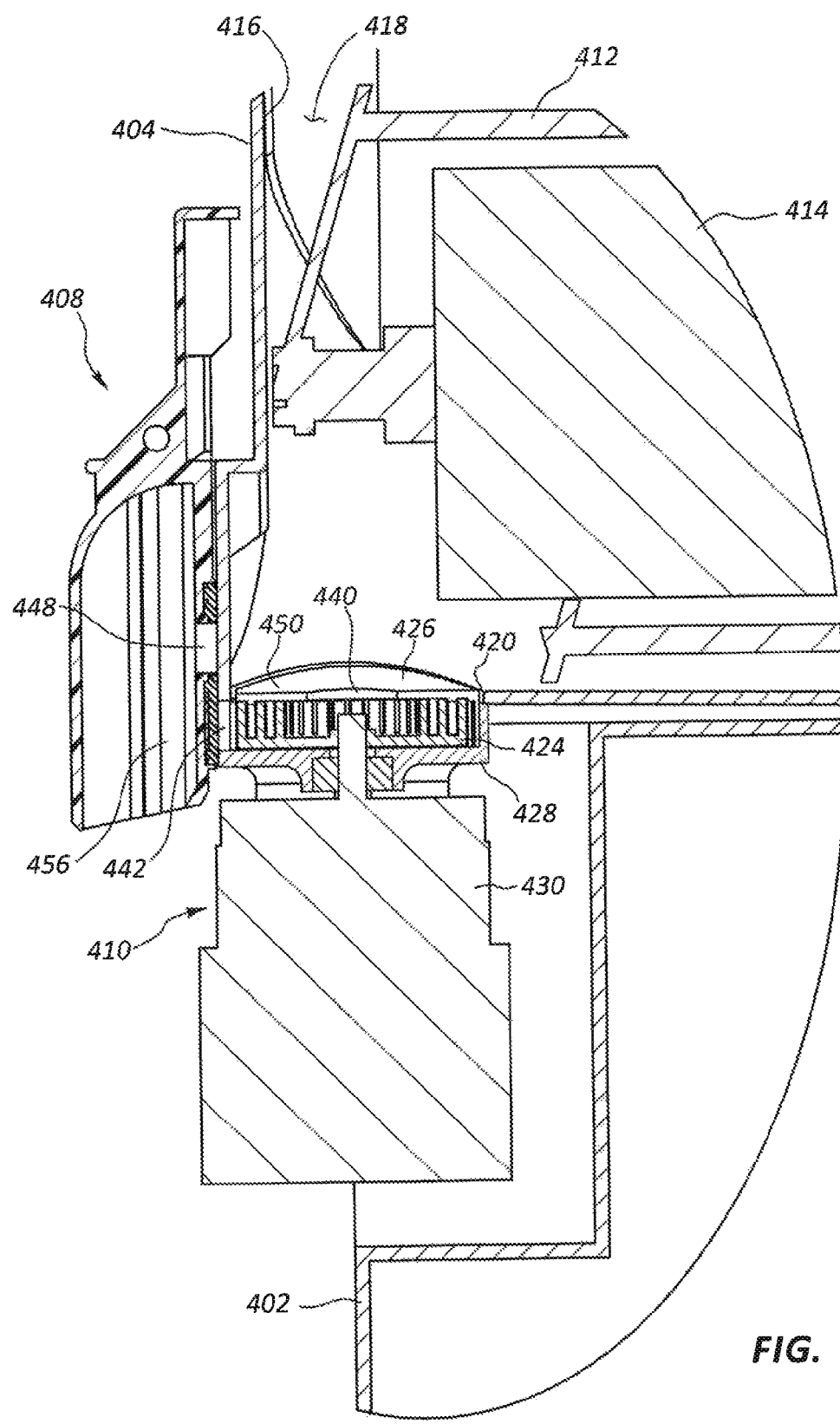
FIG. 5B is a detail view of a portion of the section view of FIG. 5A as indicated by line 5B-5B in FIG. 5A.
Figure 6:
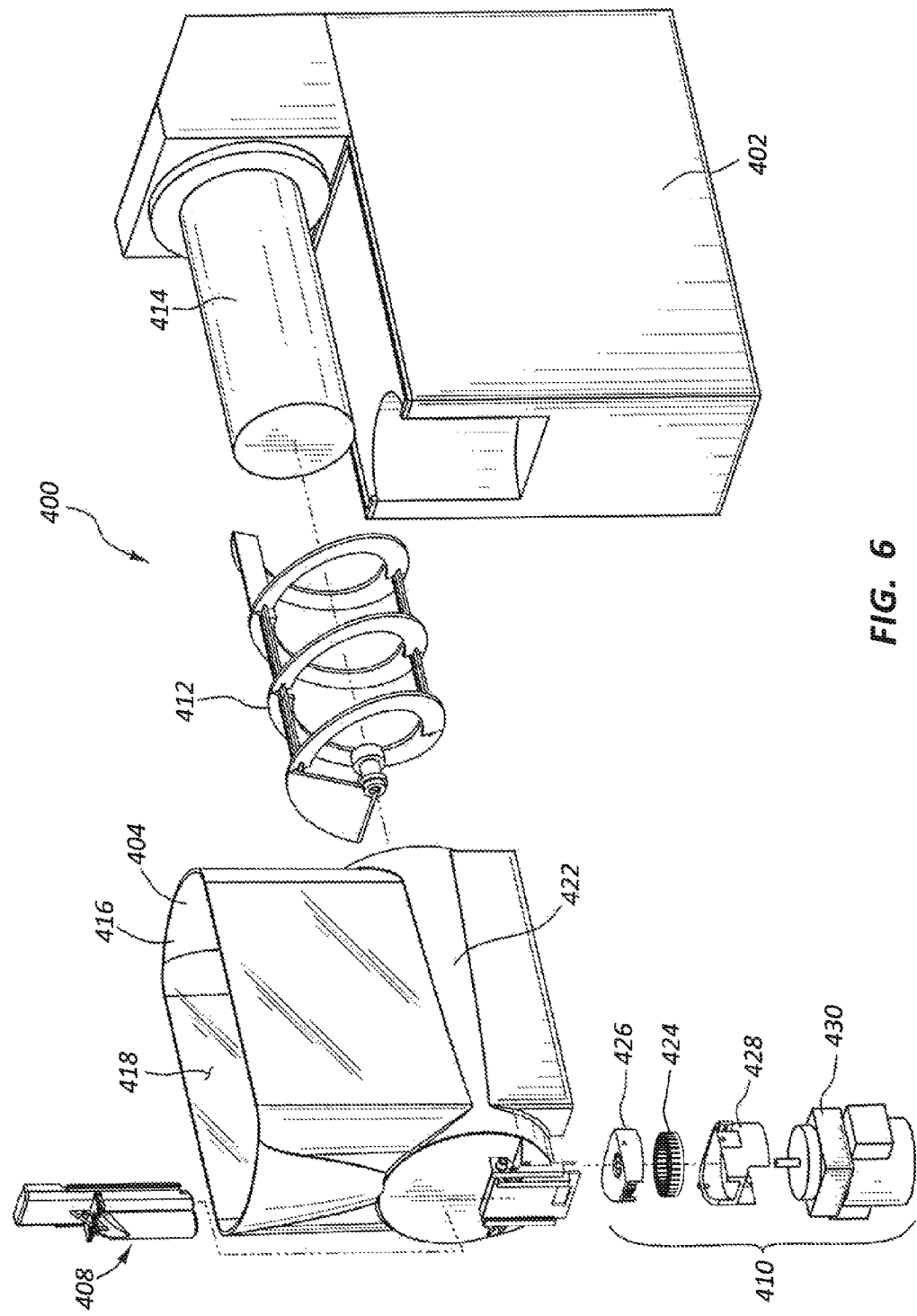
FIG. 6 is an exploded perspective view of the machine of FIG. 4A.
Figure 7A:
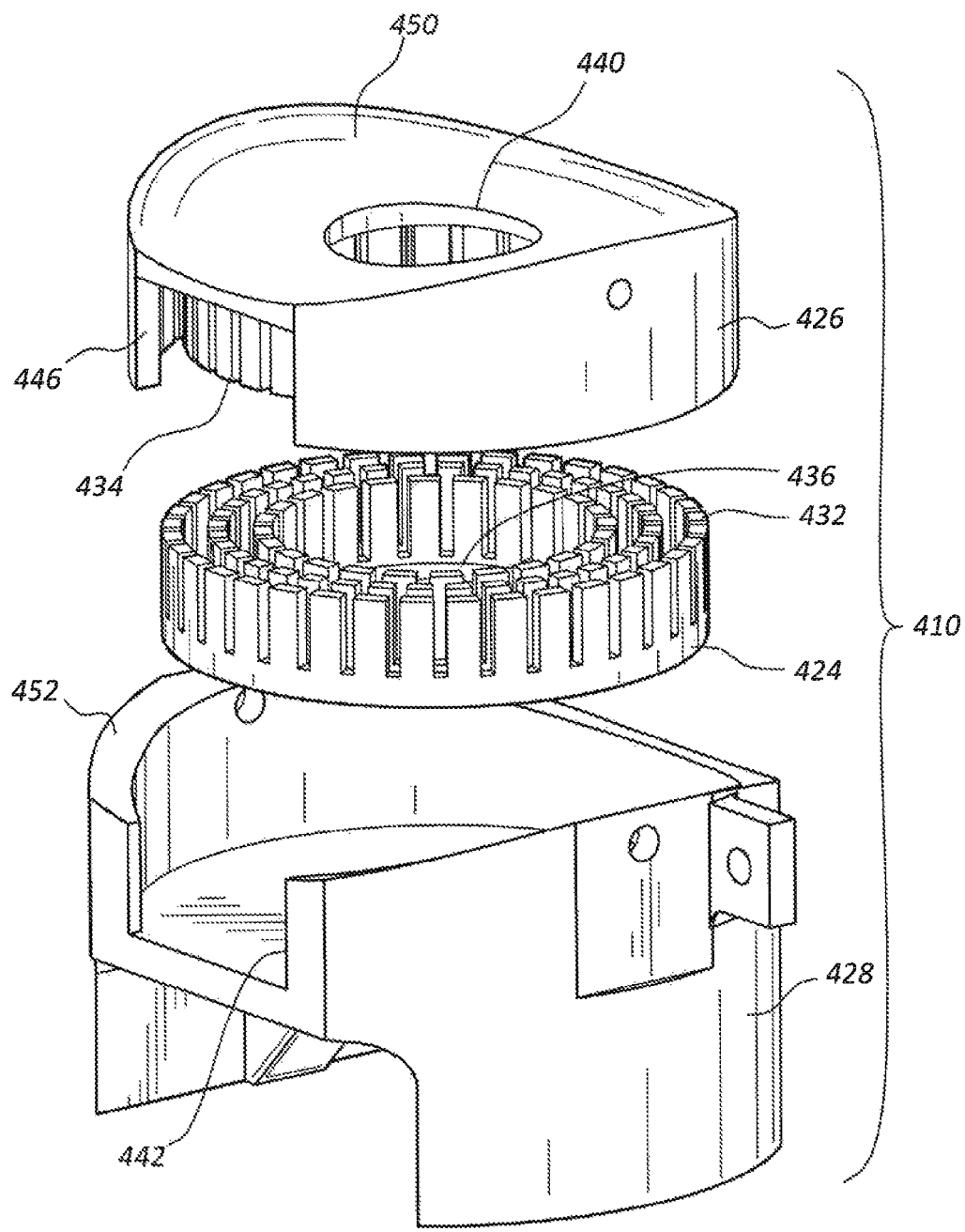
FIG. 7A is an exploded view of components of a blending assembly.
Figure 7B:
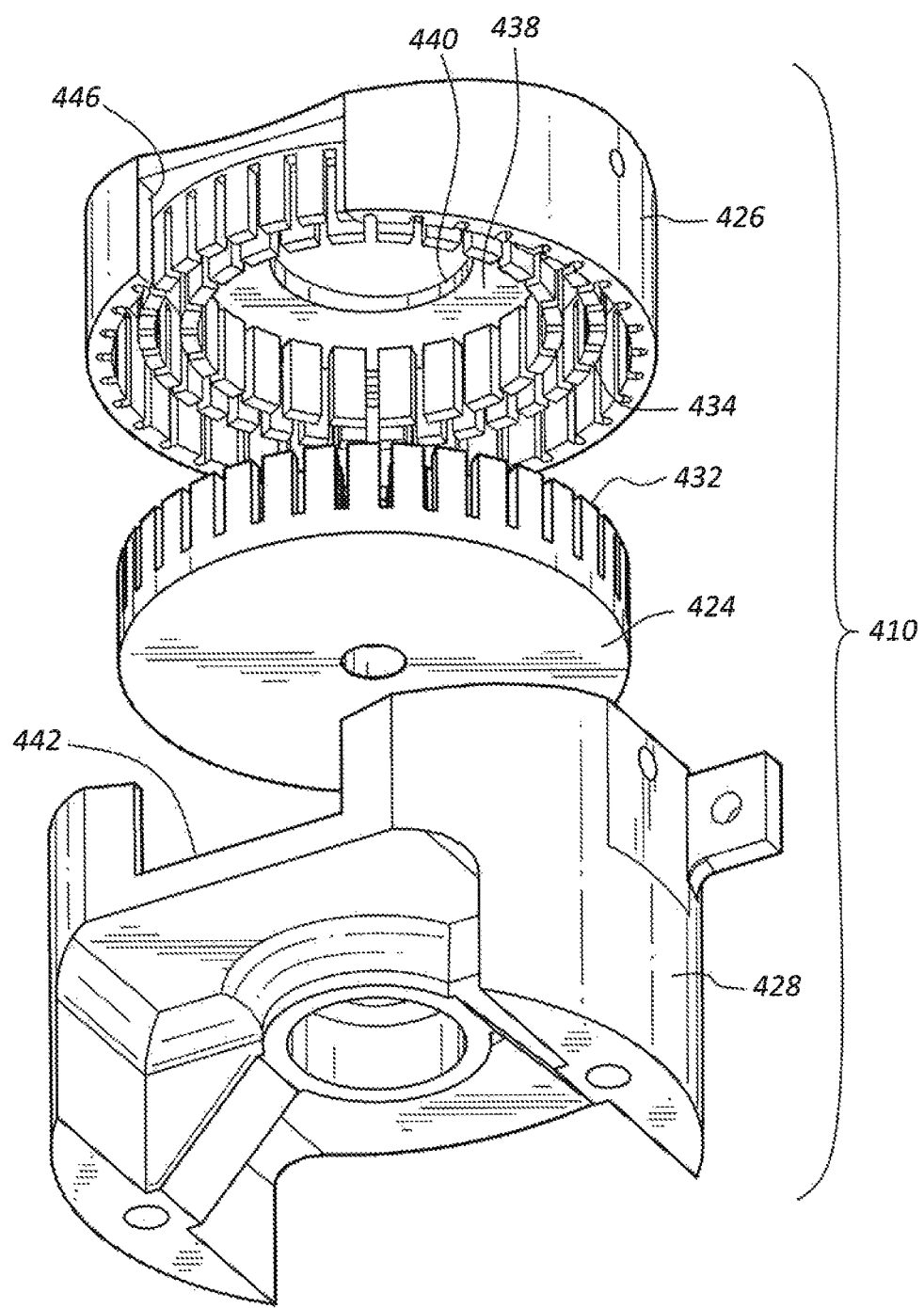
FIG. 7B is another exploded view of the components of FIG. 7A.
Figure 7C:
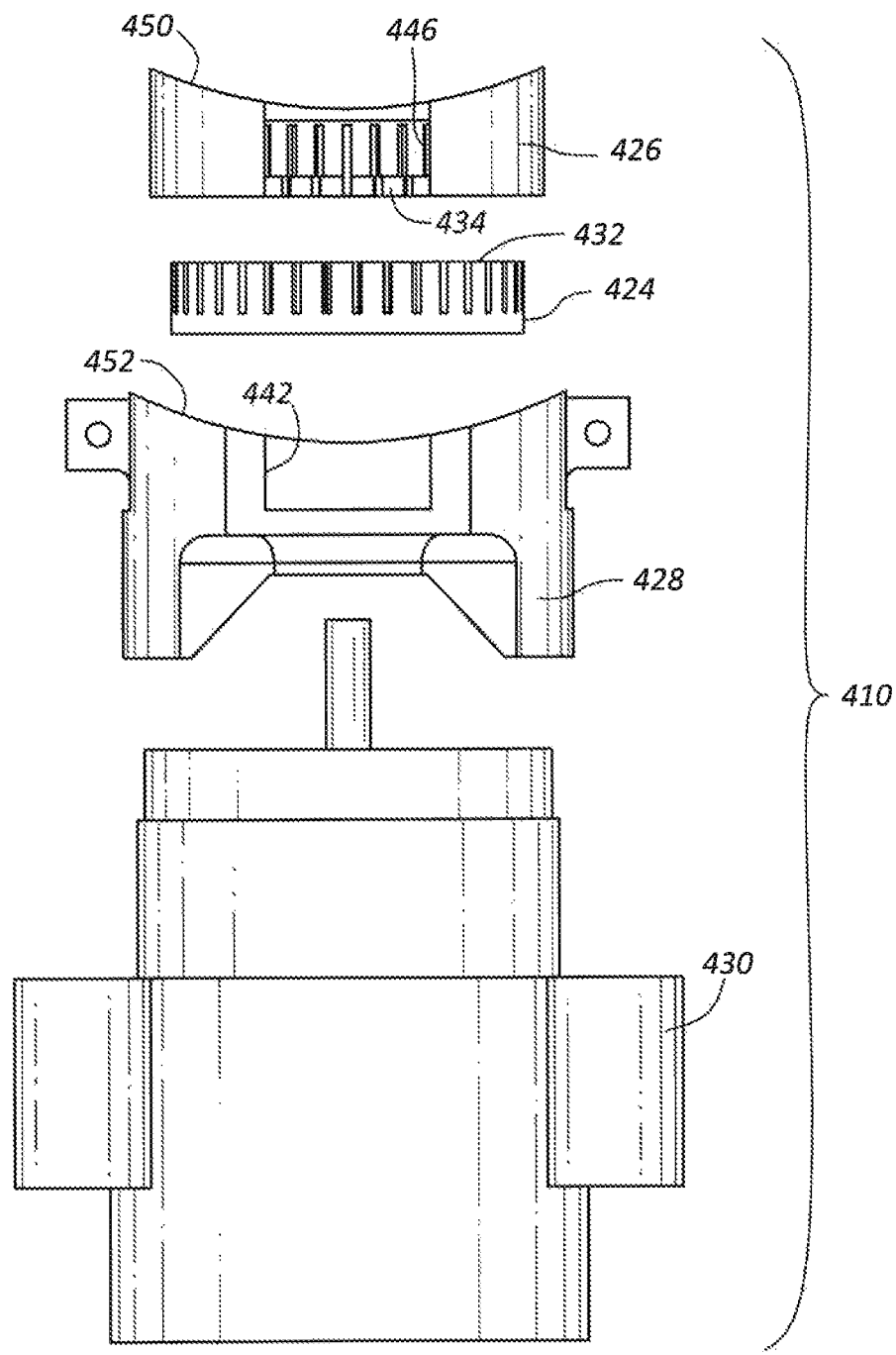
FIG. 7C is an exploded front view of components of a blending assembly according to the present disclosure.

The front of the machine 400 comprises the dispenser apparatus 408 and the blending assembly 410. FIGS. 5A-7C show details of the blending assembly 410. The blending assembly 410 may include a rotor 424, a stator 426, a base housing 428, and a drive motor 430. The blending assembly 410 may comprise an entry opening 440. The entry opening 440 allows product in the hopper 404 to move into the blending assembly 410. In this embodiment, the rotor 424 is configured to rotate in a horizontal plane, as indicated in FIG. 5B. In other arrangements, the rotor 424 may be rotated in a vertical plane and the stator 426 may therefore also be rotated to receive product from the hopper 404 from a lateral direction.

The rotor 424 and stator 426 may be concentrically aligned and may each comprise a plurality of blades 432, 434. The blades 432 of the rotor 424 may extend upward from a base surface 436 of the rotor 424 (see FIG. 7A), and the blades 434 of the stator 426 may extend downward from a base surface 438 of the stator 426 (see FIG. 7B). The blades 432, 434 of the rotor 424 and stator 426 may be arranged to radially fit between each other (see FIG. 5B) so that the blades 432 of the rotor 424 extend proximate to the base surface 438 of the stator 426, and the blades 434 of the stator 426 extend proximate to the base surface 436 of the rotor 424. When the rotor 424 is rotated at a high speed, the blades 432 spin between the blades 434 of the stator 426 and pulverize any material between the rotor 424 and stator 426.

The product being processed by the rotor 424 and stator 426 is contained by the stator 426 and the base housing 428. It may enter the blending assembly 410 through an entry opening 440 in the stator 426 and exit the blending assembly 410 through an exit opening 442 (see FIG. 5B) formed by a lower exit opening 444 in the base housing 428 and an upper exit opening 446 in the stator 426. The entry opening 440 may be sized to receive flow from the hopper 404 at a rate sufficient to provide consistent flow through the exit opening 446 of the blending assembly 410 and an exit opening 448 of the hopper 404. See FIGS. 5B and 6.

Because product is blended by the blending assembly 410 external to the inner volume 418 of the hopper 404, the blending assembly 410 may be referred to as being an external blending assembly 410. Because product must pass through the blending assembly 410 to be dispensed through the dispenser apparatus 408, the blending assembly 410 may be referred to as being positioned in series (or "serially") between the hopper 404 and the dispenser apparatus 408. Additionally, because the base housing 428 forms a lower surface that extends downward from the base of the hopper 404 (as shown in FIGS. 5A-5B), the blending assembly 410 may be referred to as being fitted in a recess in the hopper 404.

The stator 426 and base housing 428 of the blending assembly 410 may comprise contoured upper surfaces 450, 452. The contours of the upper surfaces 450, 452 may be shaped to accommodate and follow the outer path of the auger 412 as it rotates within the hopper 404. The contours may thereby limit the formation or accumulation of ice or other stationary product on the upper surfaces 450, 452 since their proximity to the auger 412 may scrape off ice or other stationary product.

The motor 430 may drive the rotation of the rotor 424. The motor 430 shown in these figures is a direct-drive motor with a driveshaft directly extending into contact with the rotor 424, but in other embodiments the motor 430 may be repositioned elsewhere in the machine 400 and the rotor 424 may be driven by a gearing, belt drive, or another indirect drive system. The motor 430 of these figures therefore indicates one possibility of a motor 430 that may be used with the machine 400 to drive the blending assembly 410. In other arrangements, the auger motor 454 (see FIG. 5A) or another motor in the machine 400 may drive the rotor 424.

The rotor 424 and stator 426 are also provided in these figures as a representation of an exemplary embodiment of a blending apparatus, and are not intended to be limiting of the scope of the various ways that product may be blended as it is dispensed from a hopper 404. For example, those having ordinary skill in the art and having the benefit of the present disclosure may understand that a blending blade (e.g., blade 508 of FIG. 8) or other blending device may be used to blend, crush, thrash, and pulverize product. The blending blade or device may be positioned to rotate in the base housing 428 or may extend at least partially into the inner volume 418 of the hopper 404.

The dispenser apparatus 408 may be a dispenser apparatus 408 used in a conventional drink dispensing machine. Movement of the dispenser apparatus 408 downward in front of the hopper 404 may move the exit opening 448 of the dispenser apparatus 408 into alignment with the exit opening 442 of the blending assembly 410 (see FIG. 5B) and allow product blended by the blending assembly 410 to exit through a spout 456. The movement of the dispenser apparatus 408 may also trigger a switch or otherwise generate a signal that engages the blending assembly 410. In this manner, the blending assembly 410 may begin blending the product to be dispensed as the dispenser apparatus 408 moves downward. By the time the exit openings 442, 448 are aligned, the product in the blending assembly 410 may have the preferred consistency for dispensing to a customer through the spout 456. Then, if the openings 442, 448 remain aligned, an additional supply of product flowing into the blending assembly 410 may be blended immediately before flowing out through the spout 456.

Figure 8:
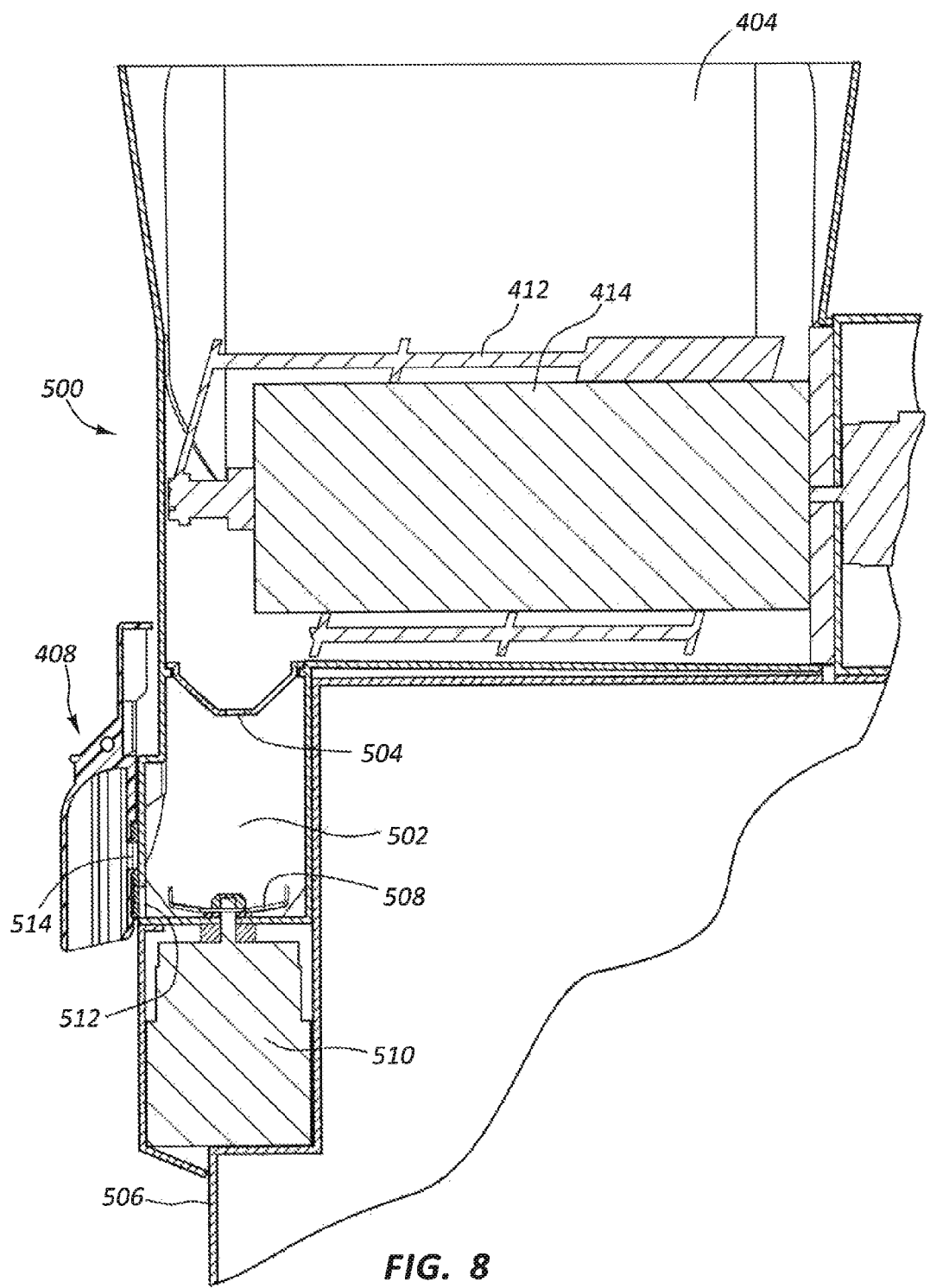
FIG. 8 is a central side section view of another machine for processing a chilled food product.

FIG. 8 shows another alternative embodiment of a chilled product processing machine 500 of the present disclosure. This processing machine 500 contains separate storage and shearing containers and is an example implementation of the system 300 of FIG. 3. This machine 500 may comprise a hopper 404, dispenser apparatus 408, auger 412, and cylinder 414 as described in connection with machine 400, and may also comprise a blending chamber 502 connected to the hopper 404. The blending chamber 502 may receive product from the hopper 404 through a fill opening 504 in the lower portion of the hopper 404. The fill opening 504 may be opened and closed (or covered and uncovered) in order to dispense product into the blending chamber 502. In some embodiments, the fill opening 504 may have its open-closed state controlled so that a predetermined or measured amount of product is dispensed into the blending chamber 502. For example, the fill opening 504 may be opened for a predetermined length of time based on the amount of product in the hopper 404. The fill opening 504 may also be opened until a predetermined mass or volume of product is measured in the blending chamber 502, at which point the fill opening 504 may be closed or covered. Having a separate blending chamber 502 may allow the user of the machine 500 to blend individual portions, servings, or batches of product with a consistently high level of quality since each batch is processed independently and may be processed until the desired consistency of product is reached.

The blending chamber 502 may be integrated into a base housing 506 of the machine 500 or may be a container detachable from the base housing 506. The blending chamber 502 may contain a blending blade 508 driven by a blending motor 510. The blending chamber 502 may therefore contain product as it is blended by the blending blade 508. After the product is blended to a desired consistency, the product may exit the blending chamber 502 through an opening 512 positioned in communication with an opening 514 in the spout of the dispenser apparatus 408. In some cases, the blending chamber 502 may be moved or removed from the machine 500 to dispense or pour out product that has been processed by the blending blade 508. For example, the blending chamber 502 may be pivotable or removable away from the machine 500 to pour out refined product. In some embodiments, the blending blade 508 may extend into the blending chamber 502 from a direction other than the bottom of the blending chamber 502, or the blending blade 508 may be replaced with another pulverizing apparatus, such as a rotor-stator assembly, a grinder, slicing blade, milling device, food processor blade, or an equivalent device.

In some arrangements, the blending chamber 502 may also comprise a secondary fill opening configured to receive ingredients into the blending chamber 502. The secondary fill opening may be covered by a door or other blocking element to prevent product from being expelled from the blending chamber 502 while the blending blade 508 is in operation. Due to the secondary fill opening, additional ingredients may be added to the product in the blending chamber 502 without the additional ingredients entering the hopper 404. This may be advantageous when fresh or frozen ingredients need to be added to the product.

Figure 9:
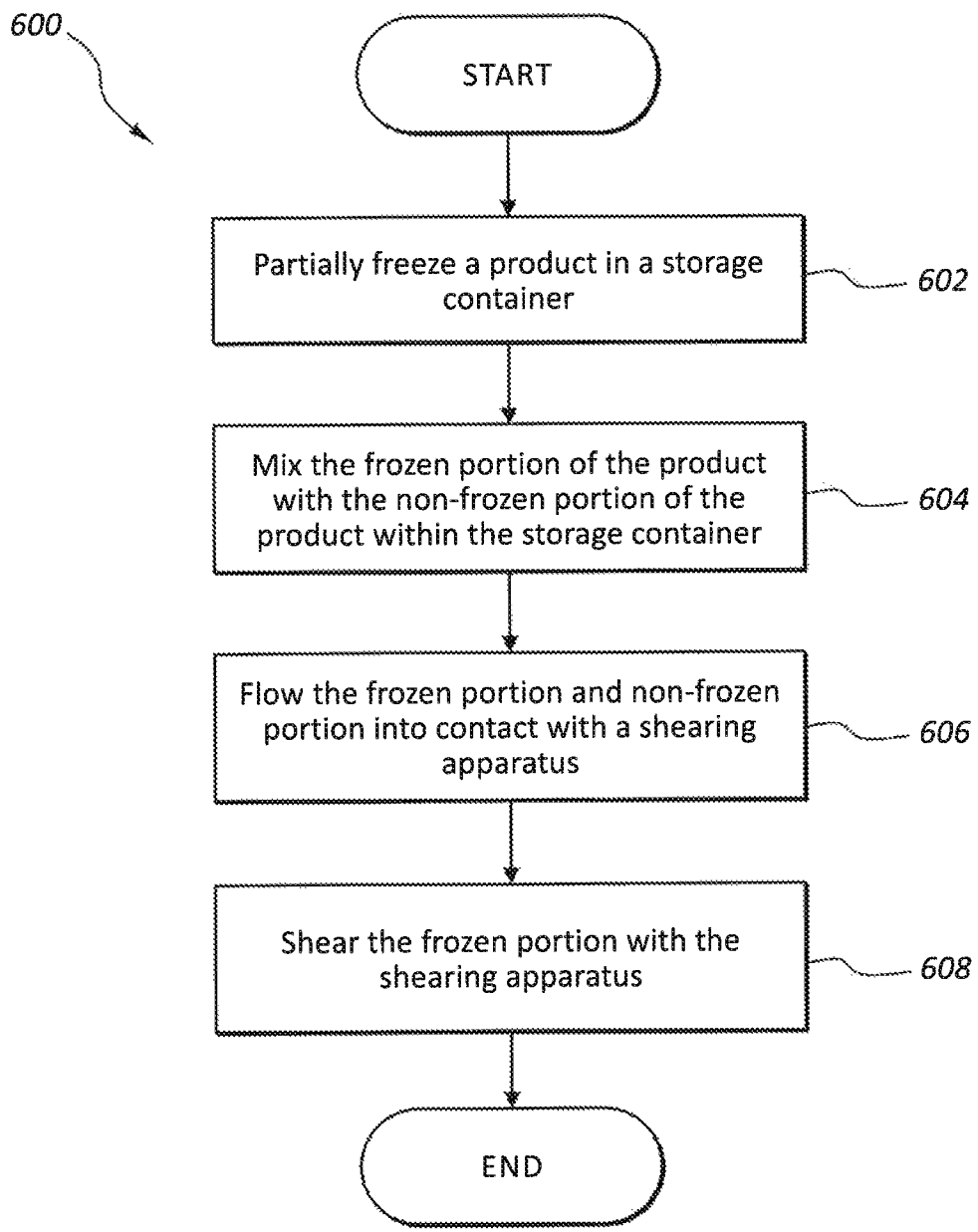
FIG. 9 is a flowchart showing an example method of processing a food product.

Another embodiment of the present disclosure is a method 600 shown in the flowchart of FIG. 9. The method 600 may comprise providing a product in a storage container, as shown in block 602. The product may be partially frozen, either by being frozen in the storage container or by being added to the storage container in a partially frozen state. The product may thereby comprise a frozen portion and a non-frozen portion in the storage container. The frozen portion may comprise ice crystals and/or other ingredients frozen in ice, and the non-frozen portion may comprise fluid and solid ingredients mixed with the frozen portion. For example, the frozen portion may comprise ice pellets or ice crystal grains/particles formed in the product, and the non-frozen portion may comprise ingredients such as water, milk, banana pieces, strawberry puree, and/or syrup. The frozen portion of the product may have a granular size. A "granular size" may refer to a size dimension of the granules of ice crystals or other frozen ingredients in the product, such as the average diameter, volume, width, or length of individual "grains" of these portions of the product. Granular size may alternatively refer to the weight of a grain of the frozen ingredients.

The frozen portion of the product may be mixed with the non-frozen portion of the product within the storage container, as shown in block 604. In some embodiments, a mixing device such as a vane, auger, or propellor mixes the product in the storage container. The mixing may generally evenly disperse and distribute the frozen portion among the non-frozen portion. Thus, the product may be a slush of frozen and non-frozen components that are intermixed.

The frozen portion and non-frozen portion of the product may flow into contact with a shearing apparatus, as shown in block 606. The product may flow due to movement of a mixing device or due to gravity acting on the product. For example, an auger or other mixing device may rotate and thereby induce flow through the storage container, such as by circulating the product to the shearing apparatus. In another example, an opening in the storage container or shearing apparatus may be opened and permit flow into contact with the shearing apparatus due to the product being pressured into or toward a drain or dispenser opening by gravity or fluid pressure.

The shearing apparatus may then be used to shear at least the frozen portion of the product that comes into contact with the shearing apparatus, and this shearing may reduce the granular size of the frozen portion of the product, as indicated by block 608. If the frozen portion comprises ice crystals, for example, the shearing apparatus may pulverize the ice crystals and thereby reduce their size. This may smooth the overall consistency of the product, and a preferred granular size of frozen portions of the product may thereby be produced. "Shearing" a product may refer to processing a product by blending, breaking up, intermixing, pulverizing, crushing, smashing, rending, smearing, disintegrating, fragmenting, fracturing, applying a shearing force to, and/or disbanding the product such that solid granules in the product are reduced in size and distributed amongst other ingredients in the product. A "shearing apparatus" may comprise an apparatus configured for shearing a product. In some embodiments, portions of the product other than frozen portions may be sheared by the shearing apparatus. In some cases, non-frozen solid ingredients (e.g., seeds, chocolate chips, or berries), semi-solid ingredients (e.g., peanut butter), or viscous liquid ingredients (e.g., syrups) may be sheared, pulverized, or blended by the shearing apparatus to reduce the size of chunks of these ingredients and distribute them more evenly throughout the finished product.

Figure 10:
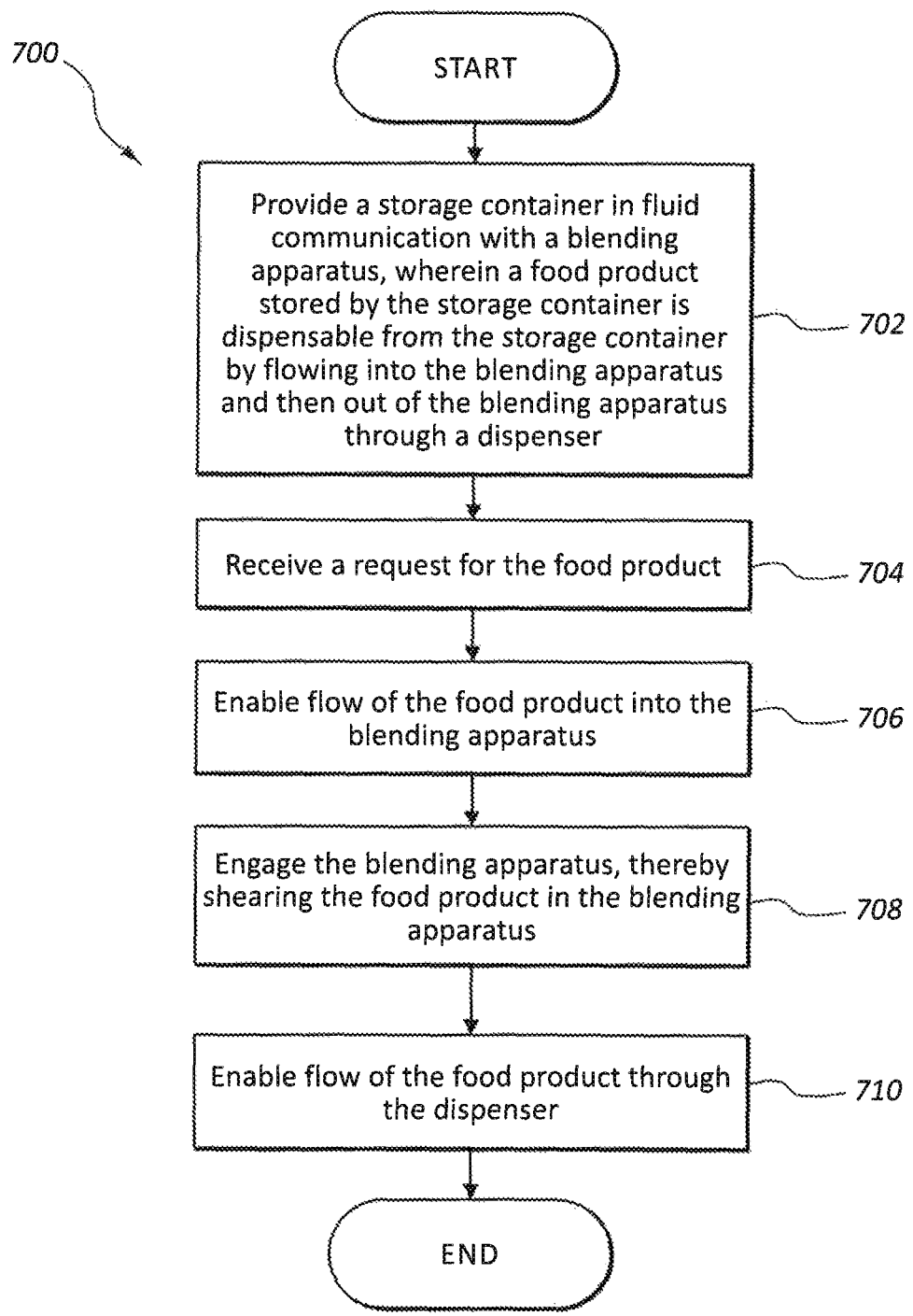
FIG. 10 is a flowchart showing an example method of processing a food product.

FIG. 10 is a flowchart indicating another example embodiment of a method of processing a food product stored in a storage container. The method 700 may comprise providing a storage container in fluid communication with a blending apparatus in block 702, wherein a food product stored by the storage container is dispensable from the storage container by flowing into the blending apparatus and then out of the blending apparatus through a dispenser.

In block 704, the method 700 may comprise receiving a request for the food product. The request for a food product may include detecting operation of the dispenser or an input device (e.g., a control button) by a user.

Block 706 sets forth enabling flow of the food product into the blending apparatus. The flow may be enabled by operating a mixing apparatus in the storage container or by inducing flow of the food product by gravity or fluid pressure. For example, an opening the storage container may be opened or uncovered and the food product may be drawn into the blending apparatus due to gravity and/or fluid pressure drawing the food product through the opening.

In block 708, the blending apparatus may be engaged, thereby shearing the food product in the blending apparatus. The blending apparatus may be engaged as a result of operation the dispenser. For example, the movement of the dispenser may activate a switch or send a signal to a controller of the blending apparatus that turns on the blending apparatus.

Block 710 includes enabling flow of the food product through the dispenser. This may entail allowing the dispenser to open sufficiently to allow the food product to escape through the dispenser, such as by aligning an exit opening in the blending apparatus with an opening or spout in the dispenser. In some embodiments, the food product may flow through the blending apparatus and directly through the dispenser, and in some cases the food product may be contained by the blending apparatus at least temporarily before being permitted to flow through the dispenser.

Figure 11:
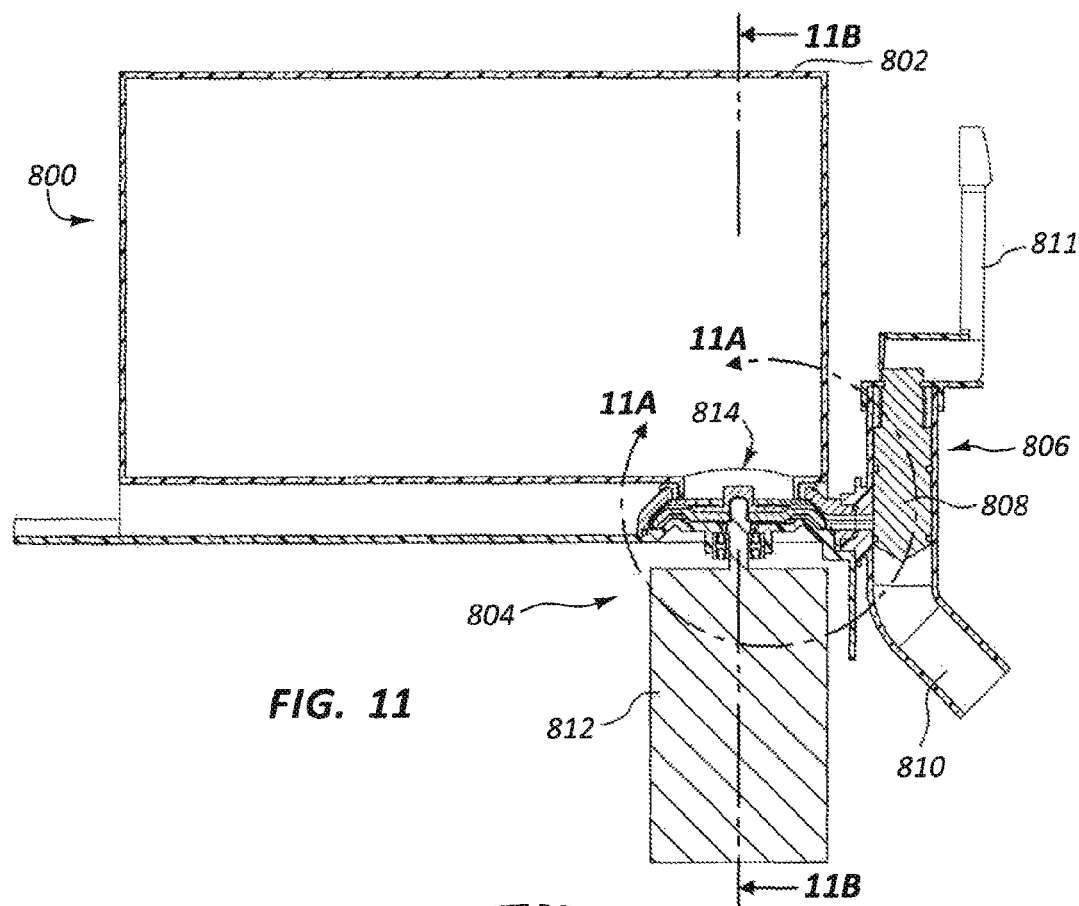
FIG. 11 is a side section view of another system of the present disclosure.
Figure 11A:
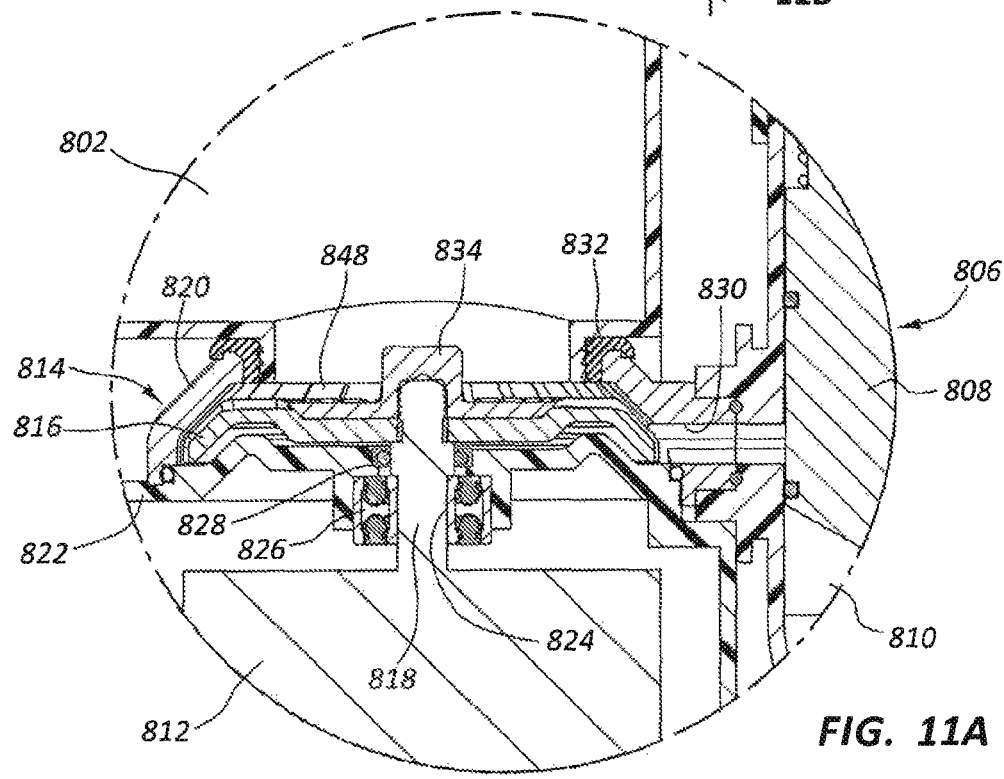
FIG. 11A is a detail view of FIG. 11.

FIGS. 11-11A are side section views of an additional embodiment of a system 800 for post-processing a chilled product. The system 800 may comprise a hopper 802, a blending apparatus 804, and a dispensing assembly 806. In some arrangements, various other components may be included as well, such as, for example, a unit for refrigeration (e.g., refrigeration 208) and a mixing apparatus (e.g., 204).

System 800 has a dispensing assembly 806 that is controlled by pushing or pulling a sealed rod 808 that opens or closes a dispensing passage 810 through the dispensing assembly 806. The rate of flow of product out of the dispensing assembly 806 may be controlled by the amount of displacement of the rod 808, since the displacement of the rod 808 directly controls the size of the opening exiting the rotor-stator assembly 814 to the passage 810. In some embodiments, the rod 808 may be displaced by a lever or handle system 811 connected to the rod 808, wherein the user may operate the lever or handle system to move the rod 808.

Some configurations of the system 800 have a dispensing assembly 806 that may electronically activate the blending apparatus 804. Thus, operating the dispensing assembly 806, such as by pulling a handle system 811, may activate the blending apparatus 804, such as by turning on a motor 812 in the blending apparatus 804 and causing a rotor 816 of the blending apparatus 804 to rotate.

The blending apparatus 804 may comprise a motor 812 and a rotor-stator assembly 814. The motor 812 may be configured to drive a rotor 816 in the rotor-stator assembly 814 via a driveshaft 818 connected to the rotor 816. See FIG. 11A. In the embodiment of FIGS. 11-11A, the motor 812 is shown directly driving the rotor 816, but in other embodiments the motor 812 may be positioned elsewhere within the system 800 (e.g., elsewhere underneath the hopper 802) and may be linked to the rotor 816 by a gearbox or other transmission device in the system 800. Thus, the motor 812 of system 800 is shown as an example configuration of many alternative configurations.

FIG. 11A is a detail view of the cross-sectional view of FIG. 11. This view illustrates the relative positioning of the rotor 816 and a stator 820 in the rotor-stator assembly 814. The rotor 816 is positioned beneath and at least partially enclosed by the stator 820. A drip pan 822 may be positioned beneath the rotor 816 and stator 820, and the drip pan 822 and stator 820 may collectively comprise a housing for the rotor 816. The drip pan 822 may comprise a driveshaft opening 824 through driveshaft bearings 826 to allow the driveshaft 818 to extend into engagement with the rotor 816. Driveshaft bearings 826 and seals 828 may hold the driveshaft 818 in the driveshaft opening 824 and prevent leaks through the drip pan 822. The stator 820 may comprise an exit opening 830 that is configured to connect to the dispensing assembly 806 and provide fluid communication with the passage 810 when the rod 808 exposes the passage 810 to the exit opening 830.

Figure 11B:
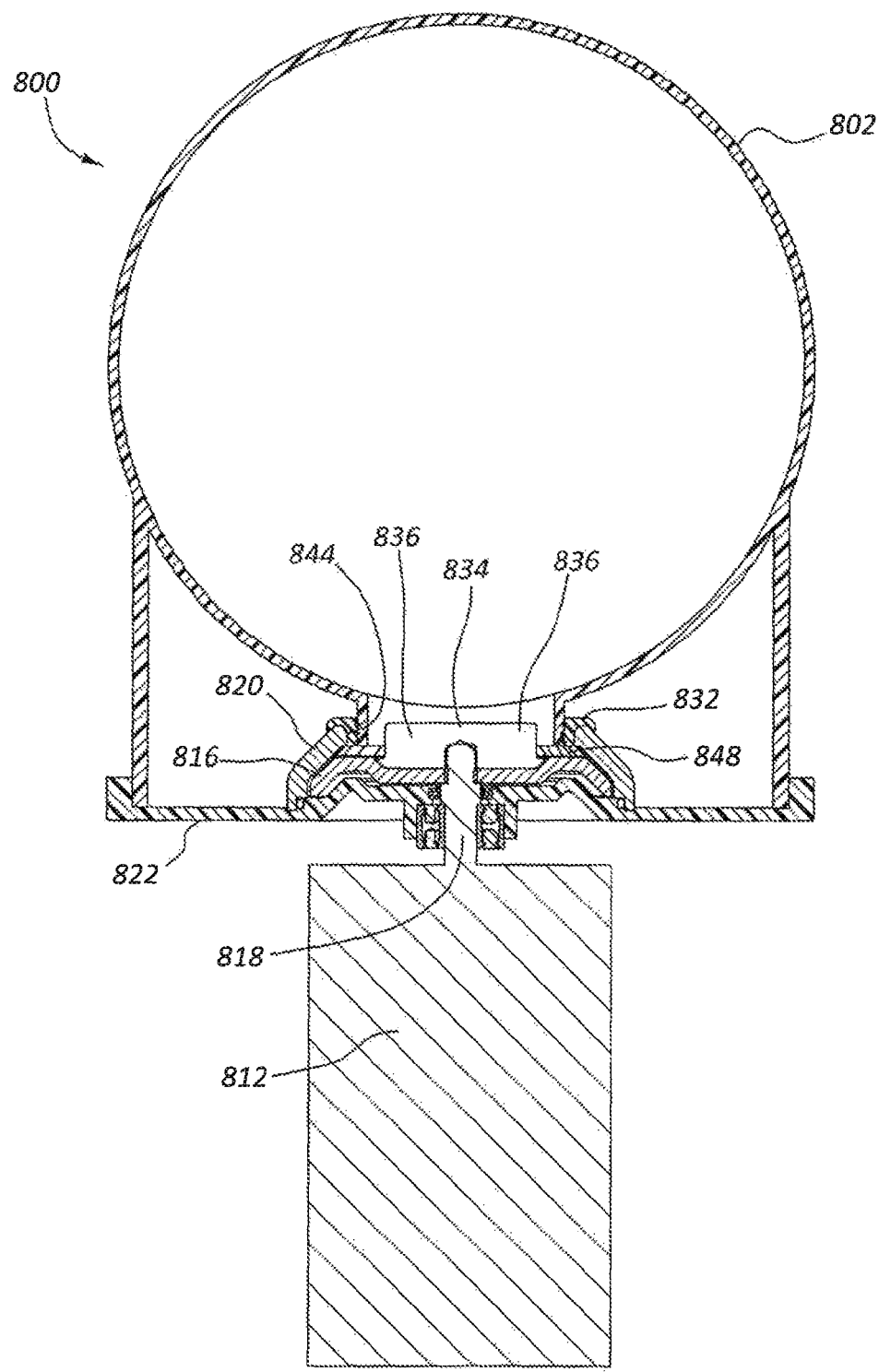
FIG. 11B is a front section view of the system of FIG. 11.

The rotor-stator assembly 814 may contact the underside of or extend into the hopper 802, and in some embodiments a seal or gasket 832 may seal the hopper 802 and the rotor-stator assembly 814. It may be beneficial to have the rotor-stator assembly 814 have an upper contour that follows the lower contour of the hopper 802 to facilitate continuous flow in the hopper 802 when product is mixed therein, to prevent interference with mixing apparatus in the hopper 802, and/or to reduce leaking between the hopper 802 and the rotor-stator assembly 814. FIG. 11B is a front section view of the system 800 of FIG. 11 taken through section lines 11B-11B in FIG. 11. In some arrangements, the rotor-stator assembly 814 may follow the bottom rounded curvature of the hopper 802.

Figure 12A:
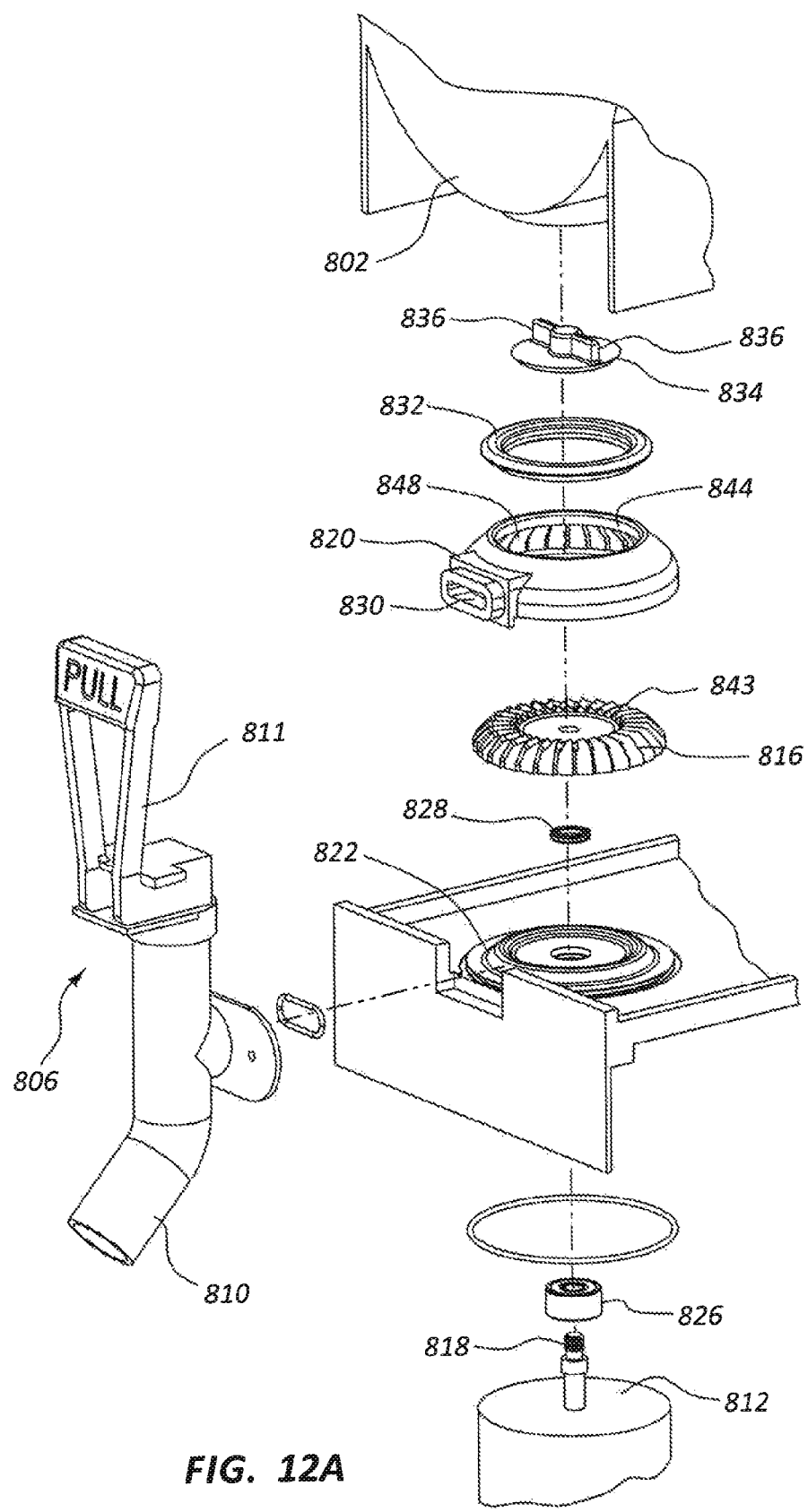
FIG. 12A is a perspective exploded view of a rotor-stator assembly of the system of FIG. 11.

The rotor 816 may be removable from the driveshaft 818. In some cases, the rotor 816 may be threaded to the driveshaft 818 and held thereon by a fastener 834. See also FIGS. 12A-12B. The fastener 834 may also be threaded onto the driveshaft 818. The fastener 834 may comprise a plurality of vanes 836 or grip features to facilitate easier tightening of the fastener 834 to the driveshaft 818. See FIG. 12A. The vanes 836 may mix and stir product that enters the stator 820 from the hopper 802, thereby redirecting the product from the center of the rotor 816 in an outward radial direction to a position between the rotor 816 and stator 820.

The function of the rotor-stator assembly 814 is described with reference to FIGS. 11A-12B. The rotor 816 has a horizontal surface portion 838, an angled surface portion 840, and a vertical surface portion 842, each of which are textured with radially-directed ridges 843. As product enters the rotor-stator assembly 814, the product first contacts the horizontal surface portion 838 after passing through an upper opening 844 of the stator 820, then flows outward due to centripetal forces and/or the movement of the vanes 836 to a position on the horizontal surface portion 838 that is underneath an angled surface 846 of the stator 820. At this point, the product continues outward to a position between the angled surface portion 840 of the rotor 816 and the angled surface 846 of the stator 820. The angled surface 846 of the stator 820 also comprises a plurality of radially-directed ridges 848. The distance between these angled surfaces 840, 846 at the peaks of the ridges 843, 848 may be small, typically within a range having an upper bound of about 0.050 inches and a lower bound less than about 0.005 inches, while the distance between the angled surface 846 and the horizontal surface portion 838 is typically a greater distance that tapers down to the distance between the angled surfaces 840, 846. In one preferable embodiment, the distance between the angled surfaces 840, 846 is about 0.020 inches. Thus, as the product enters the positions between the angled surfaces 840, 846 any ice or granules of solid material in the product is ground up and sheared between the ridges 843, 848 as it moves outward. Gravity, centripetal forces, and forces applied from pressure of product that is at the horizontal surface portion 838 cause the product between the angled surfaces 840, 846 to progress outward and downward until it is positioned adjacent to the vertical surface portion 842 of the rotor 816 and eventually swept out through the exit opening 830 of the stator 820 and through the dispensing assembly 806. The high speed rotation of the rotor 816 (typically between about 4,000 and about 10,000 revolutions per minute) pulverizes and smoothes out the product throughout this process so that chunks or other undesirably large crystals in the product are reduced and processed just before being dispensed.

Figure 12B:
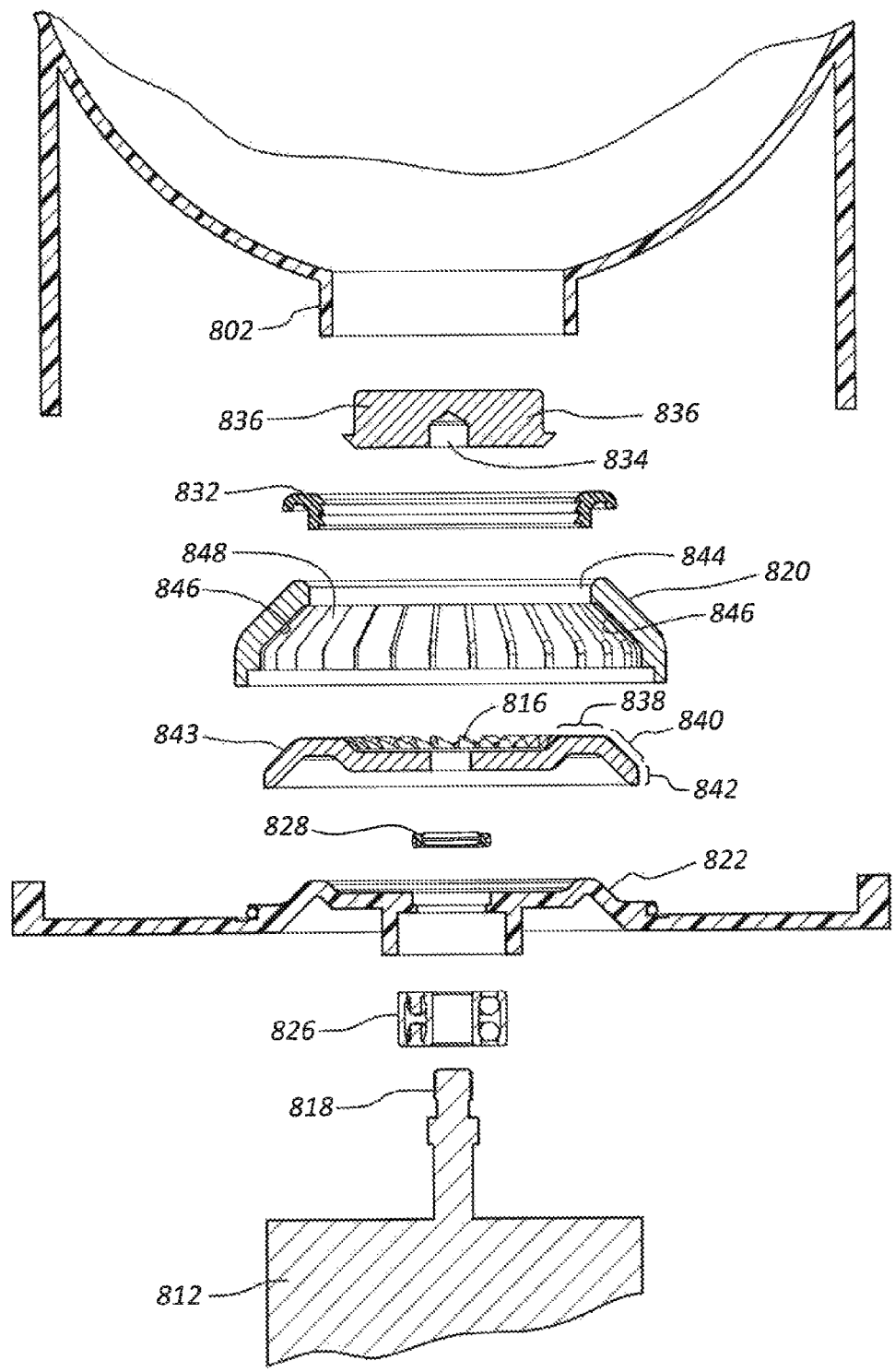
FIG. 12B is an exploded side sectional view of the rotor-stator assembly of FIG. 12A.

As shown in FIG. 12B, each of the individual ridges 843, 846 may have an asymmetric cross-sectional profile similar to a wave shape or a swept, offset triangular shape. See also FIGS. 15A-15D. Because the rotor 816 is typically only turned in one direction, the leading side of a ridge 843, 846 may have a steeper slope than its trailing side. This spaces apart the ridges and makes it easier to clean the spaces between ridges.

Figure 13A:
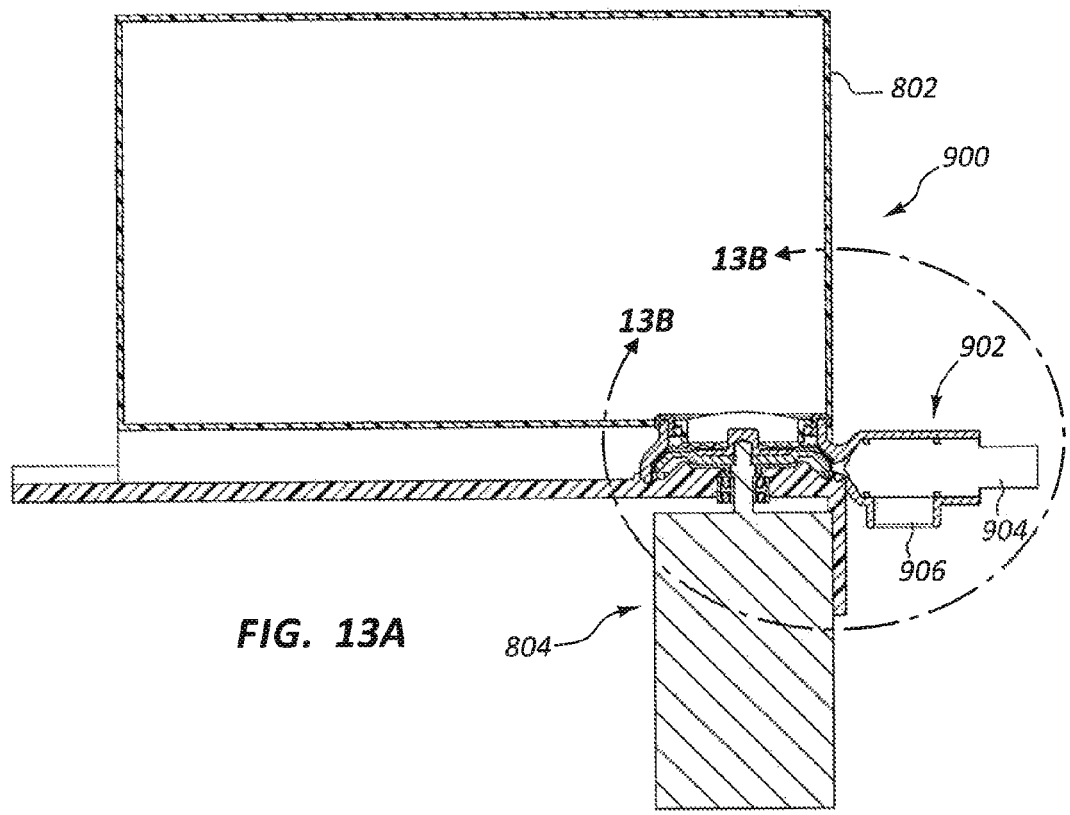
FIG. 13A is a side section view of another system of the present disclosure.
Figure 13B:
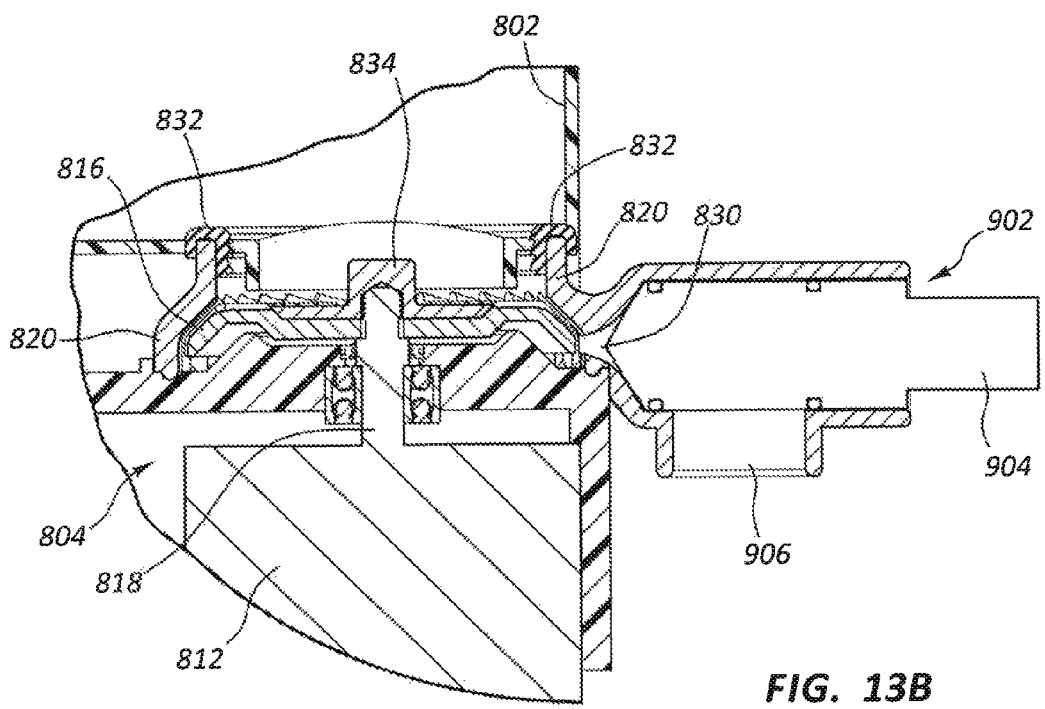
FIG. 13B is a detail view of the system of FIG. 13A.

FIGS. 13A-13B show an alternative embodiment of a system 900 for post-processing a chilled product. This system 900 has the hopper 802 and blending apparatus 804 of the system 800 of FIGS. 11-12B. The dispensing assembly 902, however, has a horizontally-oriented rod 904 used as a stopper for the passage 906 exiting the dispensing assembly 902. The rod 904 may be withdrawn from the dispensing assembly 902 to open the passage 906 and allow product to exit the system 900 through the exit opening 830 of the stator 820. Thus, these figures show that the dispensing assembly 902 may be oriented with a passage 906 and rod 904 that are oriented in a different direction compared to the other systems 200, 800 disclosed herein. The passage 906 in the dispensing assembly 902 may open directly downward in this embodiment as compared to the passage 810 of FIG. 11 that opens at a downward angle. A horizontally-oriented rod 904 may allow the minimum amount of volume between the exit opening 830 of the stator 820 and the opening of the exit passage 906. Minimizing this volume reduces the amount of product that must be pushed back through the rotor 816 and stator 820 when the rod 904 closes. In some cases, if the product does not get pushed back through the rotor 816 and stator 820 it may be compressed in that space and may form an ice dam that can block subsequent product flow.

Figure 14:
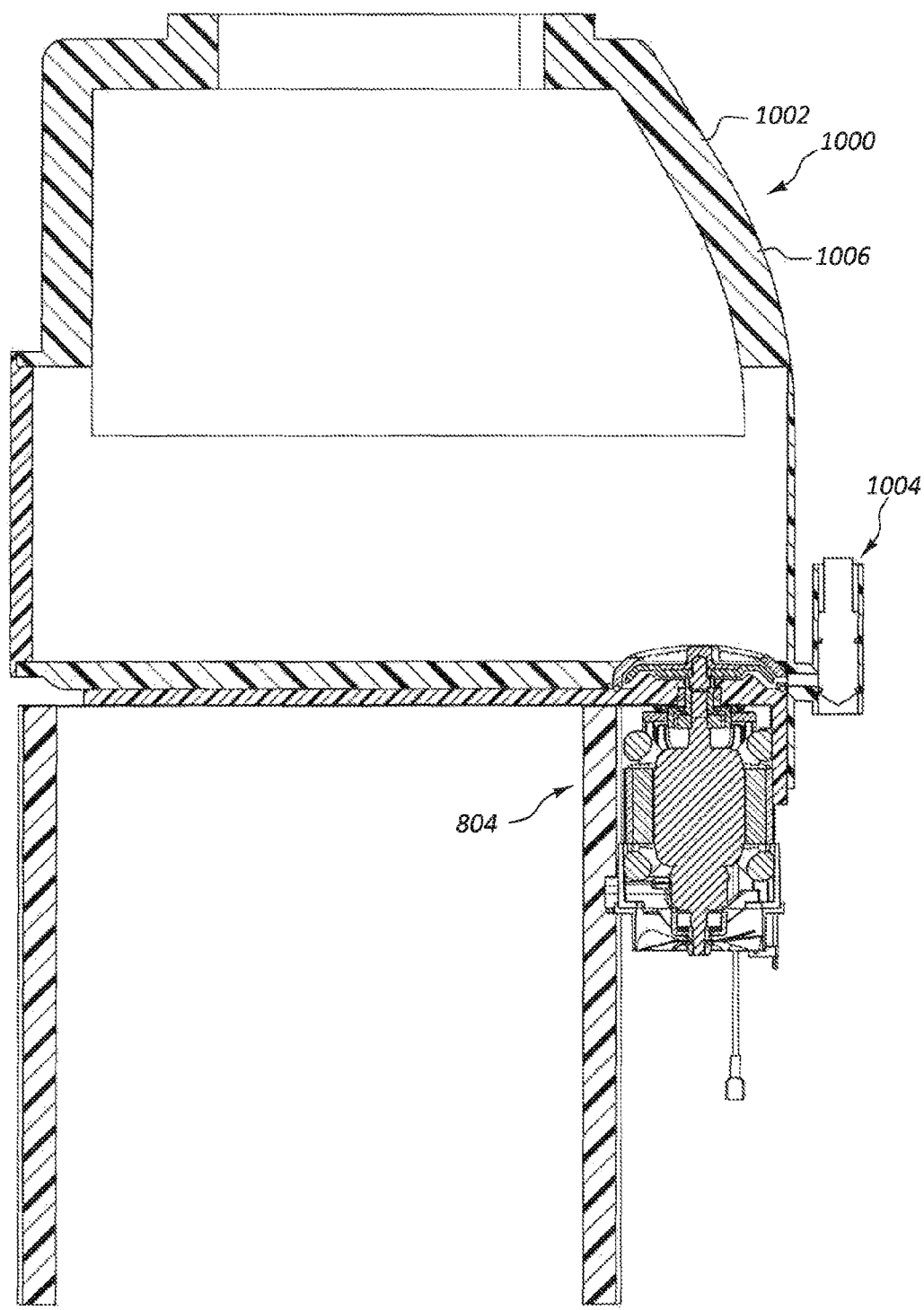
FIG. 14 is a side section view of another system of the present disclosure.
Figure 15D:
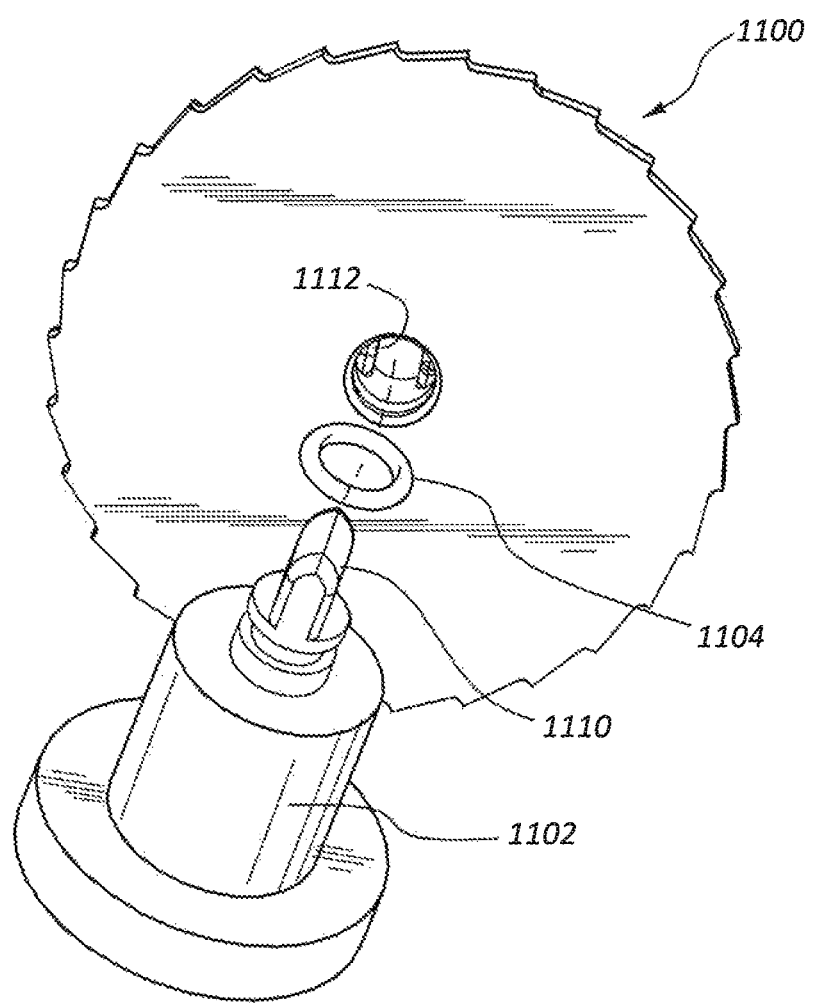
FIG. 15D is an exploded view of the rotor assembly of FIG. 15A.

FIG. 14 shows another alternative embodiment of a system 1000 for post-processing a chilled product. This system 1000 has a blending apparatus 804 of the systems 800, 900 described above and an alternative hopper 1002 shape and dispenser 1004. The hopper 1002 has a sloped front surface that reduces the volume of the system 1000 and space required for the system to be stored. The sloped surface 1006 also may permit easier viewing of the contents of the hopper 1002 from the front of the system 1000 and may be beneficial for aesthetic reasons. The dispenser 1004 may contain a rod that is vertically movable through an internal passage of the dispenser 1004. As in other embodiments disclosed herein, the rod may act as a valve controlling flow out of the system 1000 based on the position of the rod in the passage. The rod may be moved by hand or may be connected to a handle or lever system.

FIGS. 15A through 15D illustrate an alternative embodiment of a rotor 1100 for use in systems disclosed herein. One difference between the rotor 1100 of these figures and rotor 816 is that rotor 1100 is a single, integral piece connected to a driveshaft 1102, as compared with rotor 816 which is connected to the driveshaft 818 in conjunction with fastener 834. The rotor 816 and/or fastener 834 is threaded to driveshaft 818 to remain engaged with the driveshaft 818, but rotor 1100 may be engaged with the driveshaft 1102 by a pressure fit or friction fit using an o-ring 1104 or other gasket that is positioned around the driveshaft 1102 and can be received by a retaining seat 1106 within an internal cavity 1108 of the rotor 1100. See FIG. 15C. This design may facilitate easier cleaning of the rotor 1100 and may reduce the part count of the system in which it is implemented, thereby potentially reducing production and maintenance costs.

The driveshaft 1102 may also comprise a non-cylindrical engagement member 1110 configured to fit within and mate with a correspondingly-shaped engagement surface 1112 in the rotor 1100. In this embodiment, the engagement member 1110 has a rounded rectangular shape (when viewed from above or in horizontal cross-section) that fits within and mates with the corresponding rounded rectangular engagement surface 1112. Thus, the driveshaft 1102 may have a non-cylindrical shape that engages with the rotor 1100 to rotate the rotor 1100 without using threads. Torque may be transferred by the engagement member 1110 to the rotor 1100 via contact with the engagement surface 1112. The engagement member 1110 and engagement surface 1112 in other embodiments may comprise other shapes, such as, for example, a triangular, gear-shaped, or star-shaped cross section.

The surface of the rotor 1100 may comprise a horizontal portion 1114, an angled portion 1116, and a vertical portion 1118 that may respectively serve the same functions as the horizontal surface portion 838, angled surface portion 840, and vertical surface portion 842 of rotor 816.

Figure 16A:
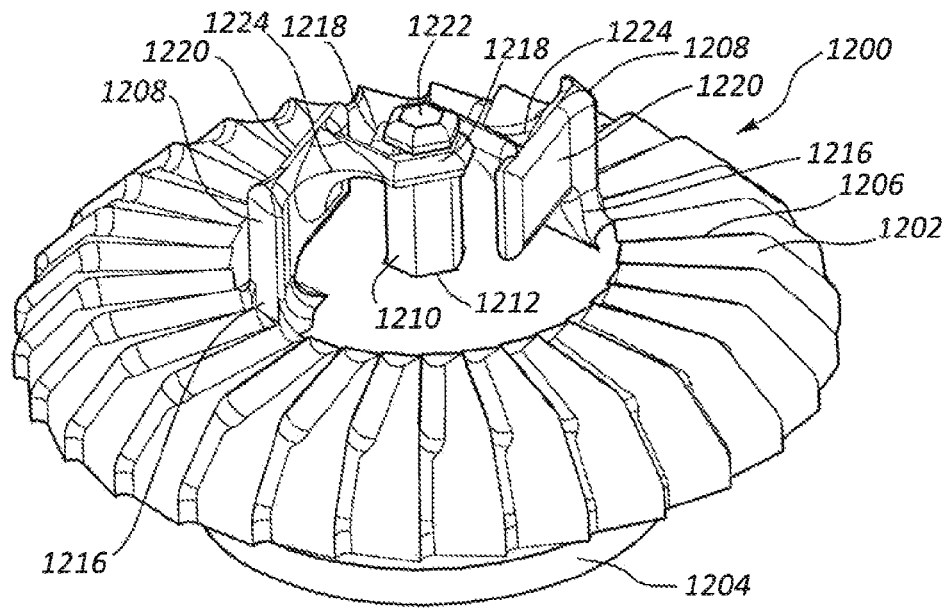
FIG. 16A is a perspective view of another rotor assembly of the present disclosure.
Figure 16B:
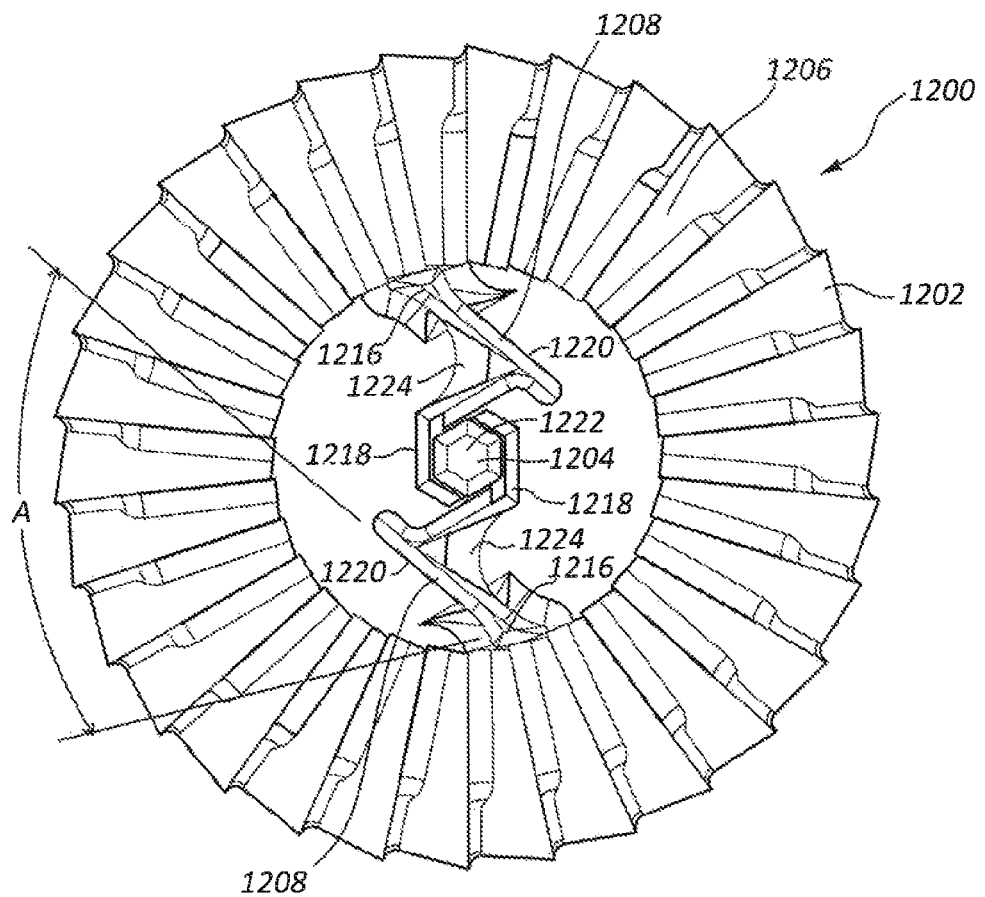
FIG. 16B is a top view of the rotor assembly of FIG. 16A.
Figure 16C:
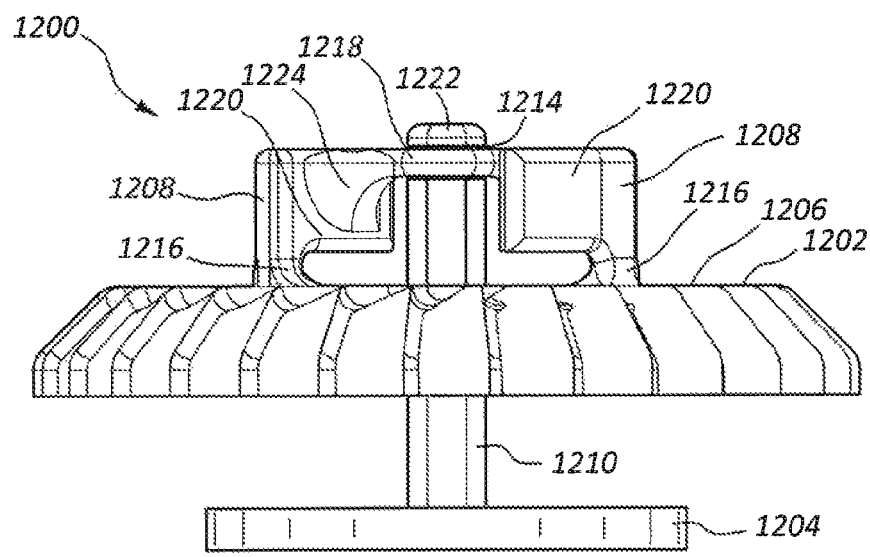
FIG. 16C is a side view of the rotor assembly of FIG. 16A.
Figure 16D:
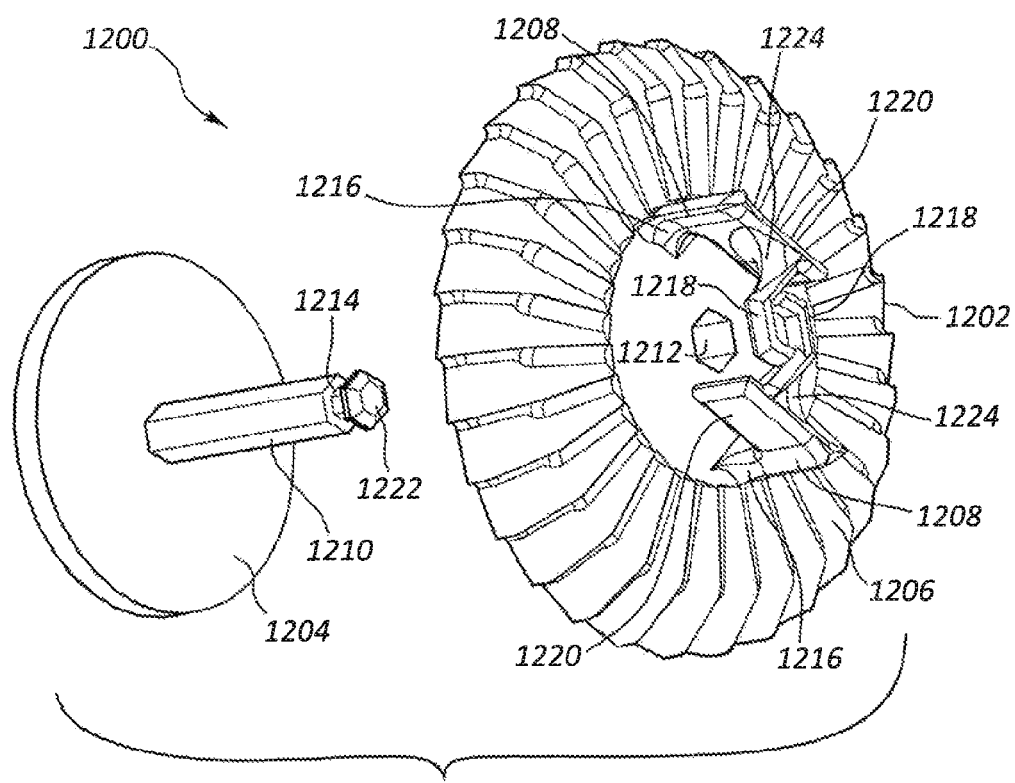
FIG. 16D is an exploded perspective view of the rotor assembly of FIG. 16A.

FIGS. 16A-16D illustrate yet another embodiment of a rotor assembly 1200 for use in systems disclosed herein. FIG. 16A shows a perspective view of the rotor assembly 1200, FIG. 16B is a top view, FIG. 16C is a side view, and FIG. 16D is an exploded perspective view. The rotor assembly 1200 may comprise a rotor 1202 and a driveshaft 1204. The rotor 1202 may include a top surface 1206 having peripheral horizontal, angled, and vertical portions similar to the surface of rotor 1100. The driveshaft 1204 may comprise an elongated shaft portion 1210 configured to extend through a central aperture 1212 in the rotor 1202. The central aperture 1212 may have a hexagonal shape in order to engage a hexagonally shaped shaft portion 1210 of the driveshaft 1204. Thus, rotation of the shaft portion 1210 may cause rotation of the rotor 1202. In other embodiments, a different aperture profile may be used, such as a square, triangular, or octagonal shape, provided that the surfaces of the aperture 1212 and shaft portion 1210 can engage during axial rotation of the shaft portion 1210.

The central area of the top surface 1206 may include a plurality of compliant attachment members 1208. The compliant attachment members 1208 may extend upward from the top surface 1206 of the rotor 1202 and may extend inward relative to the shaft portion 1210 of the driveshaft 1204 to engage a groove 1214 (see FIG. 16D) in the upper end of the shaft portion 1210. The groove 1214 may be positioned spaced from the top surface 1206 of the rotor 1202. The compliant attachment members 1208 may prevent relative sliding motion between the rotor 1202 and the driveshaft 1204 so that the rotor 1202 does not slide up and off of the shaft portion 1210 while in use. Another advantage of the rotor assembly 1200 is that there are no blind holes, so it may be easier and faster to clean than embodiments that have blind holes.

The upward extending portion of the compliant attachment members 1208 may be referred to as a post 1216, and the inward-projecting portion of the compliant members 1208 may be referred to as a compliant arm 1218 that extends from the post 1216. In some embodiments, the compliant arm 1218 may extend from the post 1216 without any intervening portion, but in the embodiments shown in FIGS. 16A-1.6D, the compliant arm extends from a vane portion 1220 that is connected to the post 1216. The vane portion 1220 may extend tangentially or circumferentially away from the post 1216 at an inward angle A relative to the tangential direction, as shown in FIG. 16B. The vane portion 1220 may have broad outer surfaces (i.e., surfaces facing away from the groove 1214) that deflect and push product peripherally while rotating. In the embodiment of FIGS. 16A-16D, the vane portions 1220 have a generally rectangular shape that has a compact yet broad surface area (see FIGS. 16C-16D).

The vane portions 1220 may be spaced above the top surface 1206 of the rotor 1202, as shown in FIG. 16C, to allow product that has reached the top surface 1206 to flow apart from the vane portions 1220. The spacing may also make cleaning the top surface 1206 faster and easier and may make the compliant attachment members 1208 as a whole more flexible relative to the rest of the rotor 1202.

Torque to drive the rotor 1202 may be transferred at the aperture 1212 so that the compliant attachment members 1208 receive little or no torque from the driveshaft 1204. The compliant arms 1218 of the system may comprise a flexible material and may be dimensioned to resiliently flex radially outward to allow the tip 1222 of the shaft portion 1210 to be inserted through the space between the compliant arms 1218 and then to flex back inward when the groove portion 1214 reaches the longitudinal position of the compliant arms 1218. When removing the rotor 1202, the opposite flexing action may take place.

In some embodiments, a flex stop portion 1224 may be integrated as part of a compliant arm 1218 that connects the compliant arm 1218 to the vane portion 1220 and/or the post 1216. The flex stop portion 1224 may be a lofted or webbed surface that increases the thickness of the compliant arm 1218, thereby increasing the stiffness of the portion of the compliant arm 1218 that is attached to the flex stop portion 1224. In this manner, the stiffness and flexibility of different portions of the compliant arm 1218 may differ from each other, which may beneficially allow the compliant attachment members 1208 to flex where needed to snap onto the driveshaft 1204 without being flexible enough for inadvertent disconnection therefrom and to allow the vane portions 1220 to be rigid enough to deflect heavy or thick product that is positioned above the rotor 1202.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A chilled food product processing machine, comprising:
  a storage container configured to hold a supply of fluid ingredients, the storage container comprising a bottom surface;
  a refrigeration apparatus configured to form ice crystals in the supply of fluid ingredients in the storage container;
  a fluid circulating apparatus within the storage container, the fluid circulating apparatus operable to distribute frozen portions of the supply of fluid ingredients through the storage container;
  a blending apparatus connected to the storage container, the blending apparatus operable to shear ice crystals in the supply of fluid ingredients, thereby reducing an ice crystal grain size in the supply of fluid ingredients, the supply of fluid ingredients being flowable from the storage container into the blending apparatus vertically through a vertically-oriented opening in the bottom surface of the storage container;
  a dispenser opening in a dispenser apparatus, wherein the supply of fluid ingredients selectably flows through the dispenser opening to exit the blending apparatus and enter the dispenser apparatus.

2. The machine of claim 1, wherein the blending apparatus extends into the storage container.

3. The machine of claim 1, wherein the blending apparatus comprises a rotatable blending blade.

4. The machine of claim 1, wherein the blending apparatus comprises a rotor and a stator.

5. The machine of claim 4, wherein the rotor and stator are concentrically aligned.

6. The machine of claim 1, further comprising a shearing passage having first and second end openings in fluid communication with the storage container, wherein the blending apparatus is configured to shear ice crystals in the supply of fluid ingredients when the ice crystals pass through the shearing passage.

7. The machine of claim 1, further comprising a shearing chamber within a housing attached to the storage container, wherein the blending apparatus is operable to shear ice crystals within the shearing chamber.

8. The machine of claim 7, wherein the shearing chamber is configured to receive an additional ingredient prior to shearing ice crystals within the shearing chamber.

9. The machine of claim 1, further comprising a surface within the storage container, wherein the refrigeration apparatus is configured to chill the surface within the storage container to form ice crystals in the supply of fluid ingredients.

10. The machine of claim 9, wherein the surface is a cylinder extending into the storage container.

11. The machine of claim 1, wherein the fluid circulating apparatus is an auger.

12. The machine of claim 1, wherein the refrigeration apparatus comprises a chilled surface extending into contact with the supply of fluid ingredients in the storage container.

* * * * *